United States Patent
Jauert

(10) Patent No.: US 6,776,544 B2
(45) Date of Patent: Aug. 17, 2004

(54) ARRANGEMENT FOR PRINTING A PRINT IMAGE HAVING REGIONS WITH DIFFERENT PRINT IMAGE RESOLUTION

(75) Inventor: Joachim Jauert, Berlin (DE)

(73) Assignee: Francotyp-Postalia AG & Co. KG (DE)

( * ) Notice: Subject to any disclaimer, the term of this patent is extended or adjusted under 35 U.S.C. 154(b) by 0 days.

(21) Appl. No.: 10/614,476

(22) Filed: Nov. 3, 2003

(65) Prior Publication Data

US 2004/0096255 A1 May 20, 2004

(30) Foreign Application Priority Data

Oct. 31, 2002 (DE) .......................... 102 50 820

(51) Int. Cl.⁷ .......................... B41L 47/46; B41J 2/315; G08K 15/00
(52) U.S. Cl. ...................... 400/120.01; 101/71; 101/91; 400/61; 400/70; 358/1.1; 358/1.16; 358/1.18
(58) Field of Search .......................... 101/91, 71, 484; 400/120.01, 61, 70, 630, 642, 103; 358/1.1, 1.16, 1.18; 347/5, 12, 33 R; 705/408

(56) References Cited

U.S. PATENT DOCUMENTS

| | | | |
|---|---|---|---|
| 4,746,234 A | * 5/1988 | Harry | 400/120.01 |
| 4,978,971 A | * 12/1990 | Goetz et al. | 347/5 |
| 5,117,374 A | * 5/1992 | Goetz | 702/150 |
| 5,146,546 A | * 9/1992 | Neuhard et al. | 358/1.16 |
| 5,155,499 A | * 10/1992 | Goetz et al. | 347/12 |
| 5,471,925 A | * 12/1995 | Heinrich et al. | 101/91 |
| 5,608,636 A | 3/1997 | Guenther | 705/408 |
| 5,651,103 A | 7/1997 | Arsenault et al. | 358/1.18 |
| 5,707,158 A | 1/1998 | Hansel et al. | 400/61 |
| 5,710,721 A | 1/1998 | Rieckhoff et al. | 714/51 |
| 5,790,768 A | 8/1998 | Windel et al. | 358/1.18 |
| 5,808,747 A | * 9/1998 | Telle | 358/296 |
| 5,894,792 A | * 4/1999 | Heinrich et al. | 101/91 |
| 5,953,426 A | 9/1999 | Windel et al. | 380/51 |
| 5,983,291 A | * 11/1999 | Leger et al. | 710/52 |
| 6,041,704 A | 3/2000 | Pauschinger | 101/91 |
| 6,493,597 B1 | * 12/2002 | Linares et al. | 700/83 |

FOREIGN PATENT DOCUMENTS

| | | |
|---|---|---|
| EP | 762 334 | 3/1997 |
| EP | 921 008 | 6/1999 |
| EP | 921 009 | 6/1999 |
| EP | 1 132 868 | 9/2001 |
| EP | 1 154 382 | 11/2001 |
| EP | 1 176 016 | 1/2002 |

OTHER PUBLICATIONS

Xilinx, "Spartan–II 2.5 V FPGA Family: Functional Description" Mar. 5, 2001, pp. 1–45.

* cited by examiner

Primary Examiner—Andrew H. Hirshfeld
Assistant Examiner—Wasseem H. Hamdan
(74) Attorney, Agent, or Firm—Schiff Hardin LLP

(57) ABSTRACT

An arrangement for printing a print image having regions of different print image resolution onto a moving postal item in a mail processing device has a microprocessor, a pixel memory, a read-only memory and a print data controller for pixel data editing while printing with a printhead. The microprocessor is programmed to operate from data in the read-only memory, a number of data strings having a switchable number of data words and to store them in the pixel memory. A maximum number of data words per data string is downwardly transgressed when the pixel data are stored compressed. The print data controller undertakes pixel data editing while printing with the printhead and is equipped to decompress the compressed pixel data per data string and to supplement the pixel data missing due to the compression such that the reduction of the number of data words per data string corresponds to the reduction in the resolution during printing. The microprocessor is programmed to supply at least one parameter for the control of the resolution to the print data controller, and the print data controller correspondingly switches the resolution that can be achieved in printing.

29 Claims, 12 Drawing Sheets

$F_D = 4$  $F_D = 2$  $F_D = 1$

| Address primitiv:= P | P = 1 | P = 2 | P = 3 | P = 4 | P = 5 | P = 6 | P = 7 | P = 8 | P = 9 | P = 10 | P = 11 | P = 12 | P = 13 | P = 14 |
|---|---|---|---|---|---|---|---|---|---|---|---|---|---|---|
| Address Group := A | | | | | Address read := C | | | | | | | | | |
| 1 | 0 | 509 | 44 | 41 | 88 | 85 | 132 | 129 | 176 | 173 | 220 | 217 | 264 | 261 |
| 2 | 6 | 3 | 50 | 47 | 94 | 91 | 138 | 135 | 182 | 179 | 226 | 223 | 270 | 267 |
| 3 | 12 | 9 | 56 | 53 | 100 | 97 | 144 | 141 | 188 | 185 | 232 | 229 | 276 | 273 |
| 4 | 18 | 15 | 62 | 59 | 106 | 103 | 150 | 147 | 194 | 191 | 238 | 235 | 282 | 279 |
| 5 | 24 | 21 | 68 | 65 | 112 | 109 | 156 | 153 | 200 | 197 | 244 | 241 | 288 | 285 |
| 6 | 30 | 27 | 74 | 71 | 118 | 115 | 162 | 159 | 206 | 203 | 250 | 247 | 294 | 291 |
| 7 | 36 | 33 | 80 | 77 | 124 | 121 | 168 | 165 | 212 | 209 | 256 | 253 | 300 | 297 |
| 8 | 510 | 39 | 42 | 83 | 86 | 127 | 130 | 171 | 174 | 215 | 218 | 259 | 262 | 303 |
| 9 | 4 | 1 | 48 | 45 | 92 | 89 | 136 | 133 | 180 | 177 | 224 | 221 | 268 | 265 |
| 10 | 10 | 7 | 54 | 51 | 98 | 95 | 142 | 139 | 186 | 183 | 230 | 227 | 274 | 271 |
| 11 | 16 | 13 | 60 | 57 | 104 | 101 | 148 | 145 | 192 | 189 | 236 | 233 | 280 | 277 |
| 12 | 22 | 19 | 66 | 63 | 110 | 107 | 154 | 151 | 198 | 195 | 242 | 239 | 286 | 283 |
| 13 | 28 | 25 | 72 | 69 | 116 | 113 | 160 | 157 | 204 | 201 | 248 | 245 | 292 | 289 |
| 14 | 34 | 31 | 78 | 75 | 122 | 119 | 166 | 163 | 210 | 207 | 254 | 251 | 298 | 295 |
| 15 | 508 | 37 | 40 | 81 | 84 | 125 | 128 | 169 | 172 | 213 | 216 | 257 | 260 | 301 |
| 16 | 2 | 511 | 46 | 43 | 90 | 87 | 134 | 131 | 178 | 175 | 222 | 219 | 266 | 263 |
| 17 | 8 | 5 | 52 | 49 | 96 | 93 | 140 | 137 | 184 | 181 | 228 | 225 | 272 | 269 |
| 18 | 14 | 11 | 58 | 55 | 102 | 99 | 146 | 143 | 190 | 187 | 234 | 231 | 278 | 275 |
| 19 | 20 | 17 | 64 | 61 | 108 | 105 | 152 | 149 | 196 | 193 | 240 | 237 | 284 | 281 |
| 20 | 26 | 23 | 70 | 67 | 114 | 111 | 158 | 155 | 202 | 199 | 246 | 243 | 290 | 287 |
| 21 | 32 | 29 | 76 | 73 | 120 | 117 | 164 | 161 | 208 | 205 | 252 | 249 | 296 | 293 |
| 22 | 38 | 35 | 82 | 79 | 126 | 123 | 170 | 167 | 214 | 211 | 258 | 255 | 302 | 299 |

Fig. 14

ARRANGEMENT FOR PRINTING A PRINT IMAGE HAVING REGIONS WITH DIFFERENT PRINT IMAGE RESOLUTION

RELATED APPLICATIONS

The subject matter of the present application is related to the subject matter of co-pending applications entitled "Method and Arrangement for Reducing Printer Errors During Printing in a Mail Processing Device" U.S. application Ser. No. 10/614,443, "Arrangement for Controlling Printing in a Mail Processing Device" U.S. application Ser. No. 10/614,476, and "Method for Controlling Printing in a Mail Processing Device", U.S. application Ser. No. 10/614,280, all filed simultaneously herewith.

BACKGROUND OF THE INVENTION

1. Field of the Invention

The present invention is directed to an arrangement for printing a print image, such as a postage meter machine, wherein different regions of the print image can be printed with respectively different resolutions.

2. Description of the Prior Art

U.S. Pat. No. 4,746,234 discloses a postage meter machine with a thermal transfer printer that allows the print image information to be easily changed. Semi-permanent and variable print image information is electronically stored as print data in a memory and read out into a thermal transfer-printing device for printing. This solution was employed in the commercial postage meter machine T1000 offered by Francotyp-Postalia AG & Co. KG and was the first time that an advertising imprint could be changed by pressing a button.

A method and an arrangement for internal cost center printing are available for department-by-department accounting of the value of postage fees consumed with the postage meter machine T1000, with a print image that is rotated by 90° or 270° being generated by means of a specific print controller (European Application 580 274, U.S. Pat. No. 5,790,768).

Printing business cards, fee stamps and court costs stamps is also possible with the T1000 machine, i.e. generating print images that differ considerably in structure and content from a franking imprint.

A franking imprint usually comprises a postal value stamp, a postmark image with the mail-receiving location and date as well as the aforementioned advertising image and is generated in the aforementioned sequence with, for example, the postage meter machine T1000 by means of printing print columns arranged perpendicular to the transport direction of the item being franked. The overall print column is imprinted by a single thermal transfer printhead. The machine can thus achieve a maximum throughput of franking matter of 2200 letters/hour with a print resolution of 240 dots per 30 mm, i.e. 203 dpi, but the manual feed of franking items limits the throughput of franking items that can be achieved in practice.

European Application 578 042 (corresponding to U.S. Pat. No. 5,608,636) discloses a method for controlling the column-by-column printing of a postage imprint, wherein encoded image information are converted before the printing event into binary signals for driving print elements, whereby the converted, variable and invariable image cannot be compiled until during printing. The decoding of the variable print data and offering of the print data for a complete column in a register ensue by means of a microprocessor. Since the data for the next print column must be edited in the time between two print columns, the computing time of the microprocessor must be in conformity with the proportion of variable print data, the level of franking items, throughput of franking items, and the print resolution. This increases the busload and limits the possibility of printing a franking imprint onto franking items faster. The franking imprint contains postal information including the postage fee data for delivering the letter. Modem postage meter machines enable a security imprint, i.e. an imprint of a specific marking in addition to the aforementioned information. For example, the aforementioned information is used to generate a message authentication code or a signature and a character string or a bar code as a marking. When a security imprint is printed with such a marking, this enables a review of the authenticity of the security imprint, for example in the post office or on the premises of a private carrier (U.S. Pat. Nos. 5,953,426 and 6,041,704).

In some countries, due to the development of postal requirements for a security imprint, the amount of variable print image data that must be modified between two imprints of different franking stamps is very high. For Canada, for example, a data matrix code of 48×48 picture elements must be generated and printed for every individual franking imprint.

An ink jet printhead can be composed of a number of modules according to the "non-interlaced" principle when the spacings between the nozzles are too large and the number of nozzles of a module are inadequate for printing a printing width of 1 inch (=25.4 mm) with one module given a resolution of approximately 200 dpi. In the ink printhead of the commercial postage meter machine JetMail®, for example, three modules are arranged offset from one another in the column direction of the print image. Each module has only one row of nozzles with 64 nozzles and the modules are arranged slanted to such an extent relative to the print column so that each nozzle row describes an acute angle relative to the transport direction of the materials to be franked. The individual nozzles of each module therefore do not print along a print image column but print along a diagonal that intersects the columns of the print image. As a consequence, pixel offset errors accumulate when the transport velocity is not correctly acquired. Despite acquiring the movement of the franking matter in the transport direction with a high-quality encoder, it is difficult to print a line straight in the direction of the print image column. The individual modules and their offset from one another, moreover exhibit tolerances that arise in the manufacture of the modules. Below a size that is spaced one print image column from the next, a print pulse is supplied with different delay for each module.

A method and an arrangement for tolerance compensation are described in European Applications 921 008 and 921 009, wherein individual printhead data are stored in a non-volatile memory of the printhead and taken into consideration in the print pulse delay. When the pixel offset error exceeds the size by which a print column is spaced from the next, then the binary pixel data in the pixel memory must be changed.

A solution for print image generation for the JetMail® disclosed by U.S. Pat. No. 5,707,158 and European Application 762 334 describes how the data describing a complete print image are generated and stored before the printing, and is based on a control datafile for field-by-field generation of the print image in a pixel memory before the printing. The print image is defined in image sub-datafiles of the control datafile and is stored as pattern in pixel datafiles. So that the printer device can directly access the pixel data, binary pixel data are not stored in a pixel memory in the sequence along a print image column but are stored as a modified pattern along a diagonal in three sub-regions lying above one another in order to compensate changes in the pattern caused due to the non-interlaced arrangement of the modules. The solution is based on complete patterns of binary pixel data modified dependent on a pixel data change unit, the binary pixel data being intermediately stored in the pixel memory. The print images are compiled before the printing such that the images are read by a print data controller directly from the pixel memory into a shift register, and are serially transmitted to a shift register in the printhead and can be transferred into a latch. The print data controller is realized together with other assemblies in an ASIC (U.S. Pat. No. 5,710,721, European Application 1 154 382).

Some postal demands can be satisfied only with this solution since the microprocessor is supported by the specific pixel data change unit in the ASIC on the Jet Mail CPU board when modifying the image data of variable picture elements. The pixel data change unit is capable of modifying the variable picture elements between successive frankings such that these are stored in the form of binary pixel data in a pixel memory before the printing. The arrangement of the picture elements (pixels) in the pixel memory required for the printing is not beneficial for the modification of picture elements by the microprocessor because of the oblique position of the print modules of the printhead, and would require a high computing outlay. Even given support by a pixel-editing unit, this can only modify a small number of variable picture elements between the imprints.

U.S. Pat. No. 5,651,103 discloses an apparatus and a method for column-by-column printing of an image in real time, wherein variable and fixed image data elements are connected to one another and deposited in a buffer in order to then be used for printing a column. The variable and fixed image data elements are stored in a non-volatile memory, with some of the fixed image data elements being compressed. The print image data for printing each print column are compiled from variable and invariable image data only before they are printed, i.e. the image data for an imprint are not present in binary form in a memory area but in a form that is comparable to the method disclosed by European Application 578 042 for the T1000. The variable image data elements in the non-volatile memory are identified by a controller, and data that correspond to the variable image data elements are transferred to a further controller in order to download the variable and fixed image data elements, unite them with one another, and then print them. The controller proposed for this requires a variable address register for each variable image data element. The number of variable image data thus is limited by the number of address registers.

A postal half-inch ink jet printhead with bubble-jet technology is currently employed in some postage meter machines, this being arranged in a cartridge of, for example, the type HP 51640 of Hewlett Packard and being protected by special means (European Application 1 132 868). 300 nozzles are arranged in two nozzle rows in the half-inch ink jet printhead, these being arranged orthogonally relative to the transport direction of the franking matter and arranged offset relative to one another in the column direction of the print image and in the transport direction of the franking matter ("interlaced" principle).

European Application 1 176 016 A2 discloses ink jet printheads that are specifically protected and drivable for a franking imprint in greater detail. In order to print a franking imprint having a print column length of 1 inch=25.4 mm and having a maximum resolution of up to 600 dpi in the print image column direction with a postage meter machine in one pass of the franking item, two half-inch ink jet printheads are arranged offset relative to one another in the print image column direction and in the transport direction of the franking item. The print image is generated from the print image columns in this orthogonal arrangement relative to the transport direction of the franking matter, with each of the printheads printing a part of the print image column. The machine thus can achieve a high throughput of franking items (5500 letters an hour). The quantity of print image data that must be modified between two imprints is not only very large but also must be made available in a shorter time. When, however, the storing of the binary print image data in the pixel memory for the pixels ensues in the specific sequence in which the pixel data are required for the drive of the two postal half-inch ink jet printheads with bubble-jet technology when printing a column, then the print image is mapped in the pixel memory as a correspondingly modified pattern of binary pixel data. The modification of picture elements by the microprocessor thus becomes complicated again and requires a high computing outlay that can be achieved in the required time only by means of an expensive microprocessor, or the throughout of franking matter is correspondingly reduced.

SUMMARY OF THE INVENTION

An object of the present invention is to provide an economical solution for the control of printing a print image having regions with different print image resolution on moving postal items in a mail processing device with high-resolution printheads for a high throughput of postal items. With simple intermediate storing and address calculation before the printout, the microprocessor responsible for the control of a complete mail processing system should be relieved.

The above object is achieved in accordance with the principles of the present invention in an arrangement for printing a print image wherein the pixel data, representing an image to printed, are arranged in data words grouped in data strings and are stored in compressed form. A print data controller has access to the memory wherein the print data are stored, and edits the print data and supplies the edited print data to a printer for printing the image. A microprocessor, which controls the overall operation of the printer arrangement, supplies a signal to the print data controller which determines a degree to decompression of the compressed data, this degree of decompression being determinative of the resolution of the printing which will take place using the decompressed pixel data. The image is printed column-by-column, and thus for columns representing a particular region of the print image, the decompression factor, and thus the amount of supplemental data which must be generated by the print data controller in the decompression process, is selected dependent on the desired resolution for that region of the image.

The inventive solution is based on the ink jet printheads that are employed meeting high demands as to the print resolution. The print resolution of a print image column disposed orthogonally to the transport direction of a piece of mail can reach a maximum value (600 dpi). The mail-processing device is, for example, a postage meter machine that prints a franking stamp as the print image with a predetermined number of print image columns approximately one inch long. A commercially available ink jet printhead having a half-inch width can only print out a part of the print image (print half-frame), so two such half-inch ink jet printheads are required for printing an entire print image. An image in the form of a pattern of binary pixel data exists for each part of the print image to be printed out by the respective ink jet printheads. The pixel data for two complete print half-frames are generated by the microprocessor using data from a read-only memory and are stored in the pixel memory in the form of data words. The number of data words in a data string corresponds to the maximally possible print resolution of the printhead. The binary pixel data stored in the pixel memory are transmitted to the print data controller and grouped corresponding to the type of printhead during printing. The print image, however, may contain sections that need not be printed with high resolution. Since a pattern with a number of data strings arranged in columns represents the print image, a representation of a compressed print image section arises when the binary pixel data are stored compressed in data words of a data string. The fact that the length of the data strings that arise is reduced contributes to a considerable saving of memory space in the pixel memory. The missing pixel data are generated by the print data controller upon decompression of the data. Pixel data are stored by words in the pixel memory in an easily modified and binary form, and a switchable number of data words are provided for printing sections in the print image with modified resolution, and the print data controller is correspondingly fashioned to be switchable dependent on the modified print image resolution.

The print data controller generates a print image dependent on the required resolution and thus relieves the microprocessor utilized in the mail processing device of the task of modifying the print data of the variable print image elements in the pixel memory between frankings. Subsequently or parallel thereto, print data are transferred to the print data controller by direct memory access (DMA). Since the microprocessor is also responsible for the complete control of the entire mail processing system, additional control functions are also realized, for instance the regulation of the transport motor for postal matter and the control of the closer device and feeder device and possibly other peripheral devices. The demands made on such a processor that is employed, which for const reasons cannot be a complicated, high capacity processor, are therefore very high and lead to a high workload for its limited computing capacity.

The modification of picture elements is simplified, which produces a lower computing outlay for the microprocessor by the half-frame to be printed by the respective printhead being represented in the pixel memory in the form of binary pixel data so that an optimally large amounts of binary pixel data of a picture element can be modified with each command of the microprocessor. This allows according to the invention, the use of a print data controller that undertakes pixel data editing for each printhead. Two pixel data-editing units are driven by a specific controller in order to transfer binary pixel data from the pixel memory into a buffer memory and in order to select binary pixel data bit-by-bit. The selected pixel data are written into a collecting register of the respective pixel data editor and are subsequently transferred into a shift register, so that the pixel data are supplied in a specific sequence from the shift register that is required when printing print columns with the two postal half-inch ink jet printheads. The microprocessor is programmed to store a number of data strings with a switchable number of data words in the pixel memory. The print data controller is equipped to supplement pixel data missing because of the compression such that the reduction in the number of data words per data string corresponds to the reduction of the resolution during printing.

The specific controller in the print data controller includes a DMA control unit, an address generator and a printer controller. The DMA control unit is switchable for generating a print image with low resolution, so that the number of DMA cycles is at least halved when loading binary pixel data into the buffer memories. The address generator, which is likewise switchable, then generates at least halved read addresses for a read access onto the buffer memories.

The printer controller is connected to an encoder that supplies a pulse rate corresponding to the transport velocity of the postal items. The printer controller is equipped to initiate the loading of a data string with the binary pixel data for one of the print columns into a buffer memory, and increments and evaluates a count value of a data string counter. When the content of this data string counter is equal to the content of a reference value register, the printer controller outputs an $F_D$ signal corresponding to the current print resolution. A control line via which at least one $F_D$ signal having a value of "one" can be transmitted is present at the control input of the DMA controller. When such an $F_D$ signal with the value "one" is present, then the DMA controller is initiated to execute a maximum number of cycles for loading data words with binary pixel data for a maximum resolution. Half the number of data words thereof is loaded into each buffer memory, provided for each half-inch printhead. The address generated by the address generator is then employed for reading out pixel data from the buffer memory. When, however, an $F_D$ signal with an alternative value is present at the control input of the DMA controller via the control line, then the DMA controller is initiated to execute fewer than the maximum number of cycles for loading data words with binary pixel data for a reduced resolution. The ratio of the maximum number of DMA cycles to the reduced number of DMA cycles corresponds to the compression factor $F_D$ communicated via the $F_D$ signal, with the compression factor $F_D$ applied to the data string being equal to the decompression factor $F_A$ communicated to the address generator via the $F_A$ signal. If further reference value registers are present, the current print resolution is modified with every further equality of the reference value of one of the reference value registers with the current count value of the data string counter. Printing is ended when the data string counter has reached a prescribed limit value.

Advantages with respect to the calculating time are achieved for the microprocessor and advantages with respect to the need for memory space are achieved for the pixel memory as a result of the print data controller.

Since the microprocessor must execute fewer cycles for loading a data string into the buffer memories in the print image regions with low resolution, the busload is reduced and the microprocessor has more time available for program processing.

Because of the modification of variable print image elements, fewer data need to be modified by the microprocessor between the frankings. The required calculating time is reduced as a result.

Since the number of data words per data string is reduced by print image sections with low resolution, smaller memory modules can be employed for storing a larger dataset, or some memory modules possibly can be eliminated, which reduces the manufacturing costs.

DESCRIPTION OF THE DRAWINGS

FIG. 14 is a table related to the address generation in accordance with the invention.

DESCRIPTION OF THE PREFERRED EMBODIMENTS

Figure 1A:
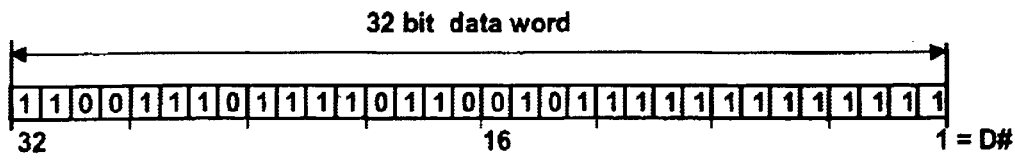
FIG. 1a is an illustration of a 32-bit data word as used in accordance with the invention.
Figure 1B:
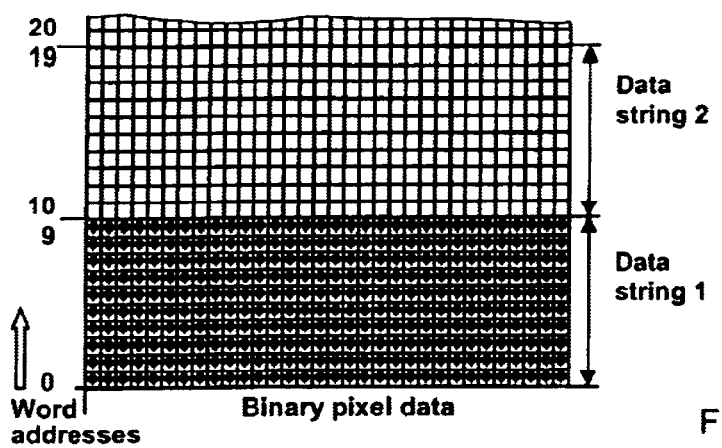
FIG. 1b is a simplified illustration of stored data words in accordance with the invention.

FIGS. 1a and 1b show an illustration of a 32-bit data word and the simplified illustration of data words that are stored in a memory area of the pixel memory that is addressable word-by-word in a known way. A first data string is stored in the area of the word addresses 0 through 9 and a second data string is stored in the area of the word addresses 10 through 19. All binary pixel data in the first data string have the value "one" (dot printed boldface). All binary pixel data in the second data string have the value "zero." Each of the data strings is composed of 10·32-bit data words. Double the number of data words per data string is needed for achieving the high resolution.

Figure 1C:
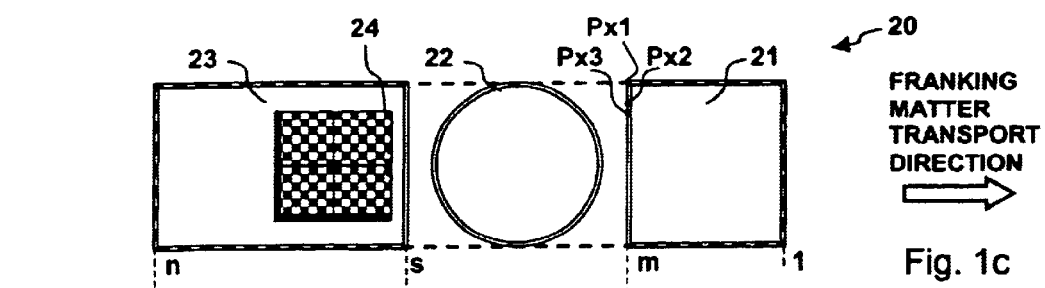
FIG. 1c is a simplified print image of a franking imprint in accordance with the invention.

FIG. 1c shows a simplified print image 20 having a franking stamp 21, postage stamp 22 and advertising stamp 23, as well as having a 2D barcode field. The 2D barcode field is shown in the advertising stamp, but can be arranged at an arbitrary location in the print image 20. A printhead (not shown) can print a print image 20 on a postal item in print image columns given a relative motion with respect to the piece of mail, which is preferably moved in a transport direction (white arrow) of the franking items. For simplicity, each of the stamp images has been reduced to an outer frame, which has been shown with a double line only for a better illustration of pixels arranged thereat. The print image 20 is intersected by print image columns oriented orthogonally relative to the transport direction. It can be seen that first, second and third pixels Px1, Px2 and Px3 lie in the print image column m. A number of print image columns 1, . . . , m, . . . , n that are meaningful for a column-by-column printing is assumed only for explaining the vertical and horizontal resolution of the print image 20. This letter would require an ink-printing module having a single nozzle row with the print image column length (European Application 581 395). Such an ink printing module is only utilized in special cases and is not yet commercially available, however, how a printing with qualitatively high resolution can be realized with an arrangement of two commercially available ink printing modules, for example type HP51645A of Hewlett Packard, shall also be explained below. Given a high franking matter transport velocity, for example, a horizontal resolution of 300 dpi and a maximum vertical resolution of 600 dpi in print image column direction are achieved. This resolution is adequate for a 2D barcode field 24, so that the franking matter transport velocity need not be reduced further in order to achieve a higher horizontal resolution. For franking imprints, however, a low vertical and horizontal print image resolution of 300 dpi in each direction suffices in most instances. Tests implemented by the Francotyp-Postalia AG & Co. KG with an ink suitable for franking have shown that it is advantageous when printing is inplamented with only every other nozzle of the printheads. Since less ink proceeds onto the franked item, the number of imprints that can be printed with an ink cartridge is increased. The ink also dries faster and is not smudged when the franked letters are placed on top of one another. In this case, it suffices when a number of data strings of 320 bits each are stored in the pixel memory for printing.

Figure 1D:
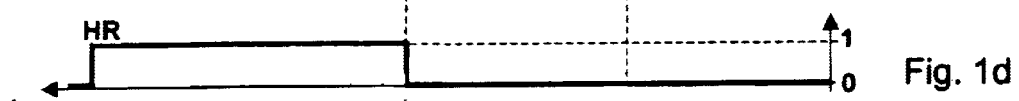
FIG. 1d is a pulse/time diagram for an HR signal for a print image according to FIG. 1c.

FIG. 1d shows a pulse/time diagram for an HR signal for a print image according to FIG. 1c. The value of the HR signal is changed from "zero" to "one" only after a print image column s has been reached. The value can be switched back to "zero" when a further print image column n is reached.

Figure 1E:
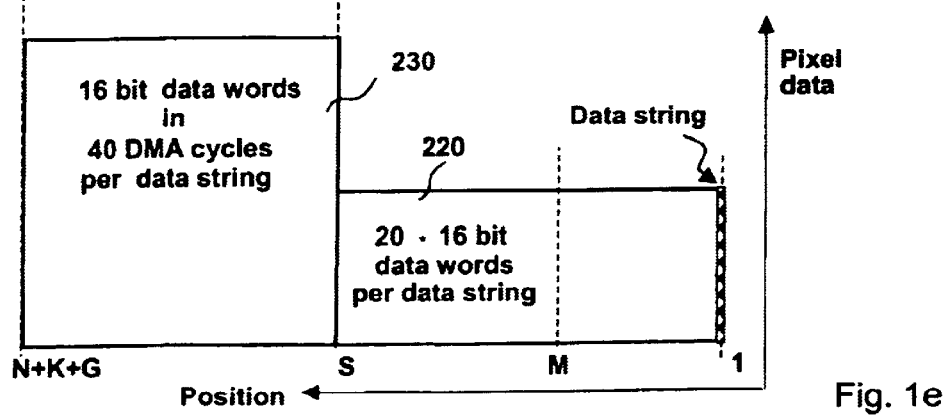
FIG. 1e is an illustration of a data string arrangement for a print image according to FIG. 1c.

FIG. 1e shows an illustration of a data string arrangement for a print image according to FIG. 1c. A first data string in column direction is arranged in a position 1 (saw tooth band). A first number of data strings (not shown in detail) each having a respective plurality of up to 320 binary pixel data can be arranged in columns in the positions $1 \leq M \leq S-1$ and fill an area 220. A further number of data strings (not shown in detail) each having up to 640 binary pixel data can be arranged in columns in the positions S through N+K+G and fill an area 230. The areas 220 and 230 each has a number of data strings allocated to it that are respectively transmitted into the buffer memories of the print data controller in 20 or 40 DMA cycles of 16 bits each via bus when loading the 320 or 640 pixel data. The busload is reduced when loading with only 20 DMA cycles.

Figure 2:
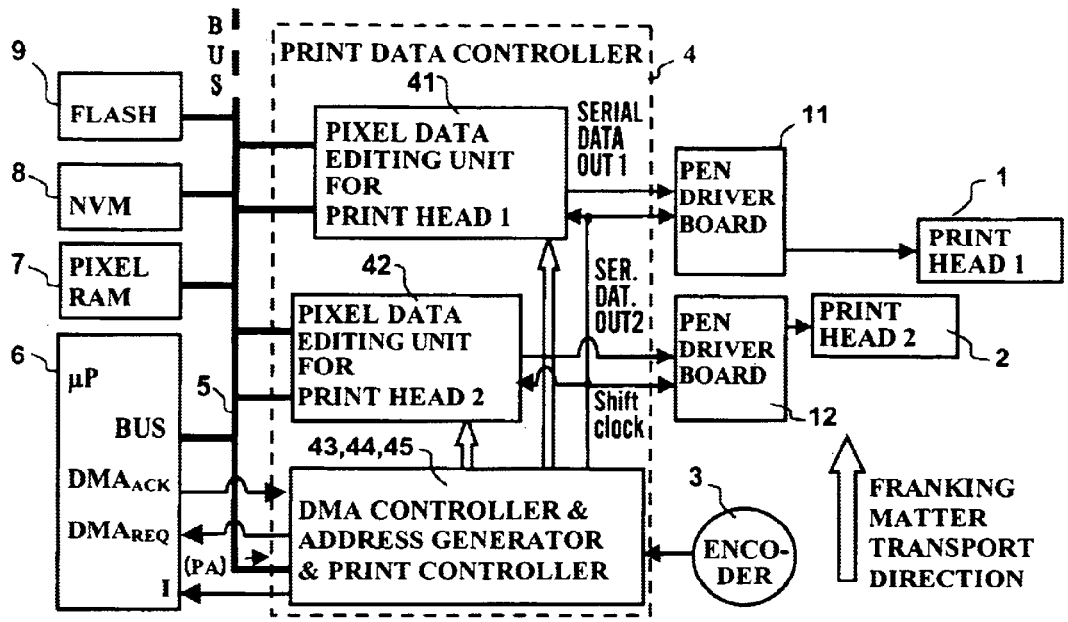
FIG. 2 is a block circuit diagram for the pixel data editing by a print data controller in accordance with the invention.

FIG. 2 shows the block circuit diagram of a preferred circuit arrangement for the pixel data editing by a print data controller. First and second printheads 1 and 2 are respectively connected via driver units (pen driver board) 11 and 12 to a print data controller 4 that, given a direct memory access, accepts 16-bit binary print image data in parallel from a bus 5 at its input side, and outputs serial binary print image data to the driver units 11 and 12 at its output side. Via the bus 5, at least a microprocessor 6, a pixel memory 7, a non-volatile memory 8 and a read-only memory are connected in terms of address, data and control. An encoder 3 is connected to the print data controller 4 in order to trigger the intermediate storing of the binary pixel data and the printing of the print image columns, each printhead 1 and 2 being operated with a maximum clock frequency of 6.5 KHz. An ink jet printer that is postally secured for a franking imprint and can be driven via an appertaining driver unit (pen driver board) and that is arranged in an ink cartridge of the type HP 51645A of Hewlett Packard is disclosed in greater detail in European Patent Application EP 1 176 016. The microprocessor 6 is programmed to supply at least one parameter PA via bus 5 to the print data controller for controlling the printing with different resolution. The print data controller 4 has a first and second pixel data-editing units 41 and 42 and the appertaining controls 43, 44 and 45. A printer controller 45 is connected to a DMA controller 43 and to an address generator 44 and the address generator 44 is connected in terms of control to the pixel data-editing unit 41, 42. The printer controller 45 is directly connected to the microprocessor 6 via the bus 5 and via a control line for an interrupt signal I. The DMA controller is connected to the microprocessor 6 via a control line for DMA control signals $DMA_{ACK}$, $DMA_{REQ}$. The microprocessor 6 and the pixel memory 7 preferably have a 32-bit data bus available in order to access the pixel data word-by-word. An internal DMA controller of the microprocessor 6 also allows the addressing of 16-bit wide data words. The binary pixel data from the pixel memory 7 are made available to the two pixel data-editing units 41, 42 by data strings.

Figure 3:
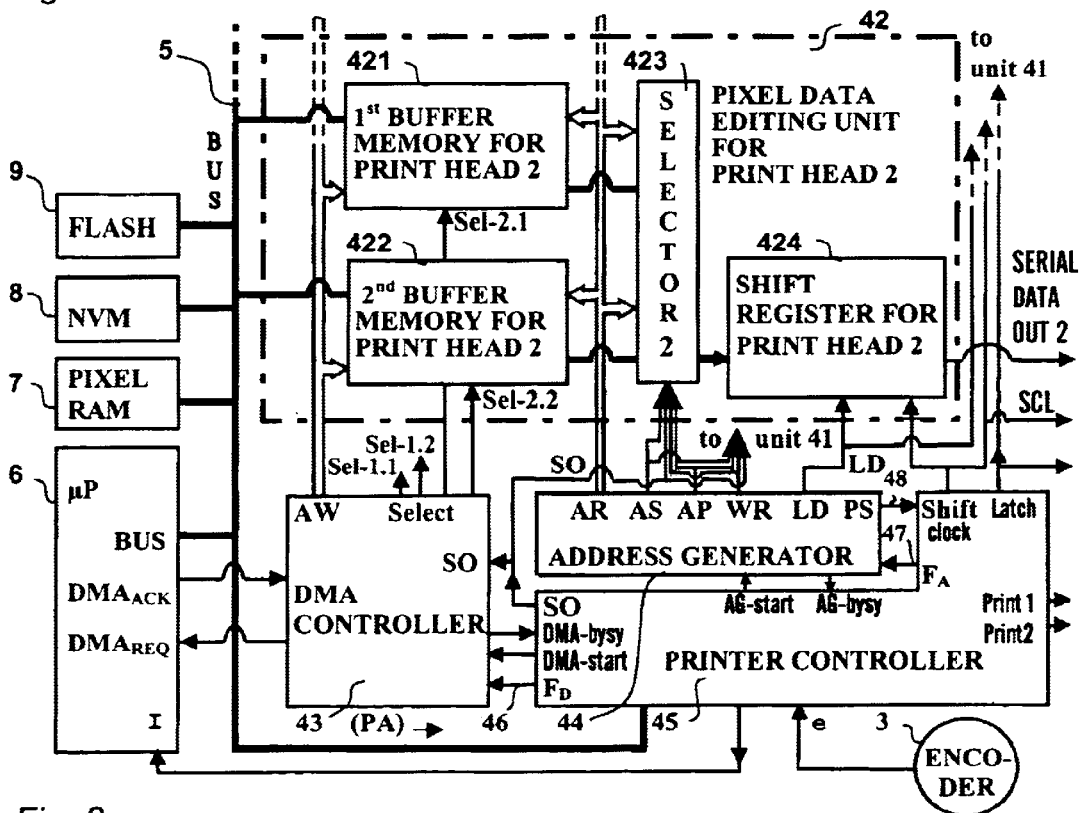
FIG. 3 is an excerpt from the circuit arrangement according to FIG. 2 with a pixel data-editing unit for the second printhead.

FIG. 3 shows an excerpt from the circuit arrangement according to FIG. 2 with a pixel data editing unit 42 for the second printhead, a DMA controller 43 for a direct memory access (DMA), an address generator 44 and a printer controller 45. In terms of control, the printer controller 45 is connected to the DMA controller 43 and to the address generator 44, and the address generator 44 is connected to the pixel data-editing units 41 (not shown) and 42. The encoder 3 is connected to the printer controller 45. The latter is directly connected to the DMA controller 43 via control lines for first DMA control signals (DMA start and DMA busy), with the DMA controller 43 being supplied with the DMA start signal by the printer controller 45, the pixel data thereby being made available to the pixel data editing unit (41, 42) by data strings as the result of a number of implemented DMA cycles. The DMA controller 43 outputs the DMA busy signal having the value "zero" to the printer controller 45 in order to signal that the direct memory access is ensuing and the DMA cycle has ended. The printer controller 45 is connected to the address generator 44 via at least one control line for supplying a start signal (AG start). Although not shown, the address generator 44 has a unit for generating read addresses and means for forming an address read signal AR dependent on the decompression factor $F_A$, whereby the address read signal AR corresponding to the quotient of the generated read addresses and the decompression factor $F_A$. The latter proceeds from an $F_A$ signal that is communicated from the printer controller via a control line 47. When a number of address read signals AR has been generated for an address group A, the address generator 44 outputs a print start signal PS to the printer controller 45 via control line 48.

The printer controller 45 is connected to the microprocessor 6 via the bus 5 and via a control line for an interrupt signal I. At least the microprocessor 6, the pixel memory 7, the non-volatile memory 8 and the read-only memory 9 are connected via the bus 5 in terms of address, data and control. The printer controller 45 includes means for the generation and output of a switchover signal SO and is connected to via a control line to the DMA controller 43 and to the pixel data-editing unit 42. The pixel data editing unit 42 is driven in order to select one of the buffer memories 412, 422 with the switchover signal SO for a transmission of pixel data to the driver unit 12. The pixel data can be supplied group-by-group with the binary pixel data of a data string that has already been stored. The switchover signal SO is supplied to the DMA controller 43 in order to select the other of the buffer memories 412 and 422 for a loading of pixel data. The DMA controller 43 includes means for the generation and output of selection signals Sel_2.1, Sel_2.2 dependent on the switch status of the switchover signal SO in order to intermediately store the binary pixel data in the first or the second of the two buffer memories 421 or 422. Given a transmission of pixel data from one of the two buffer memories 421 or 422 to the driver unit 12, the respectively other buffer memories are successively selected by the selection signals for the intermediate storage of a data string. Each of the two pixel data-editing units has its input side connected to the bus 5, but they are only connected to the less significant 16 bits of the data bus. As used herein the terms "data word" and "by words" in the following exemplary embodiments mean a 16-bit wide data word unless the data word width is expressly otherwise indicated. The pixel data for a half-inch printhead require only half the space (maximum of 320 bits from each data string) in the pixel memory 7 from which these pixel data are made available to the pixel data-editing unit 42. One data string for both printheads consequently requires that an intermediate storage of 20·16-bit data words is undertaken twice, for example into the respectively first buffer memories. For successive data strings, the first and second buffer memories 421 and 422 are selected in alternation by the selection signals Sel-2.1 and Sel-2.2.

The DMA controller 43 is connected in terms of control to the microprocessor 6 and to the buffer memories 421 and 422, the DMA controller 43 includes means for the generation and output of address write signals AW that, given an access onto the binary pixel data stored in the pixel memory 7, allow them to be written into the buffer memories 421, 422 of the pixel data editing unit 42. For the addressing by words, the DMA controller 43 supplies a 5-bit address signal AW for pixel data for the second printhead to a separate address input of the each of first and second buffer memory 421 and 422. The DMA controller 43 supplies a first selection signal Sel_2.1 for pixel data for the second printhead to a separate control input of the first buffer memory 421 for pixel data for the second printhead. The DMA controller 43 supplies a second selection signal Sel__2.2 for pixel data for the second printhead and to a separate control input of the second buffer memory 421 for pixel data for the second printhead.

The address generator 44 includes means for the generation and output of address signals AR, AP and of control signals WR, LD, PS and the address signals AR, AP and control signals WR, LD are supplied to the pixel data editing unit 41, 42 for the selection of the intermediately stored pixel data and for grouping them in a predefined sequence.

Each pixel data editing unit has two buffer memories, a selector for the selection of the binary pixel data and a shift register for the parallel-to-serial conversion of the binary pixel data offered in a new sequence. The address generator 44 supplies the generated address read signals AR to the buffer memories and to the selector of the pixel data-editing unit. The primitive address signals AP and the write control signal WR are supplied to the selector and a load signal LD is supplied to the shift register. Moreover, the printer controller 45 supplies the switchover signal SO to the selector 423. The address generator 44 supplies an address read signal AR for the selection of the data word with the pixel data that are intended for the second printhead. For addressing by words, the more-significant bits of the address read signal AR are at a separate address inputs of the first and second buffer memories 421 and 422. The four less-significant bits of the address read signal AR are at an address input of a second selector 423 and allow an addressing within the 16-bit wide data word. The parallel data outputs of the first and second buffer memories 421 and 422 for pixel data for the second printhead are at a first and second inputs of the selector 423 that, controlled by the address generator 44, supplies a 14-bit parallel data signal at its output to the parallel data input of a shift register 424 for pixel data for the second printhead. The shift register 424 is controlled by a shift clock signal SCL of the printer controller 45 and outputs a serial data output signal SERIAL DATA OUT 2. For the control of the selector 423, the address generator 44 also outputs a primitive address AP and a write signal WR. The address generator 44 outputs a load signal LD to the shift register 424. The printer controller 45 outputs signals Latch and Print2 for the control of the en driver board 12 and is connected to the DMA controller 43 via at least two control lines for the control signals DMA start and DMA busy. Via a control line for the output of the signal SO, the printer controller 45 is connected to corresponding control inputs of the DMA controller 43 and the pixel data-editing unit 42. The printer controller 45 has evaluation means for evaluating the address and control signals communicated via the bus 5, these being evaluated in view of the occurrence of a print command, and stores the parameters PA such as HRS, H, S required for controlling the printing with different resolution in memories. The print controller 45 generates at least the signals DMA-start, AG-start, SO, $F_D$, $F_A$, stores the latter in registers, and is in communication with the DMA controller 43 via control lines for DMA-start, DMA-busy, SO and $F_D$ signals. The SO and $F_D$, $F_A$ signals are not generated until the reception of a print command, and the print resolution is prescribed by the parameter H as an even-numbered compression factor (for $F_D=F_A=2$ or 4) that corresponds to the quotient of the number of data words for high resolution per number of data words for low resolution. When operation is carried out with different compression factors (according to user option), preferably H=2 or 4 for low resolution, a 3-bit wide $F_D$ signal can be formed and communicated to the DMA controller 43, or an $F_A$ signal with 3 bits can be formed and communicated to the address generator 44. Otherwise, when operation is exclusively carried out with F=2 for low resolution, only the bit of the least significant place has to be evaluated.

Triggered by the print command, the printer controller 45 outputs a first control signal DMA-start to the DMA controller 43. In response thereto, the DMA controller 43 generates a request signal $DMA_{REQ}$ and sends this to the microprocessor 6. The microprocessor has an internal DMA controller (not shown) available to it that, given a direct memory access, applies a specific address to the pixel memory (RAM) 7. As a result a communication by words of binary pixel data to the buffer memory via the bus 5 is enabled. To that end, the DMA controller 43 supplies an address write signal AW to the buffer memory. Via DMA, the microprocessor 6 can, for example, read a 16-bit wide data word with pixel data out from the pixel memory 7 and communicate it to the print data control unit. The microprocessor 6 sends an acknowledge signal $DMA_{ACK}$ to the DMA controller 43 in order to synchronize the generation of the address write signal AW in the DMA controller 43 with the DMA cycle of the microprocessor 6. The executive sequence in the DMA controller shall be explained in greater detail below on the basis of FIG. 12a.

Per DMA cycle, a 16-bit wide data word with binary pixel data proceeds into a buffer memory. After 20 DMA cycles, each of the four buffer memories can offer a total of 320 bits for further data editing. For achieving a print resolution of 600 dpi, two of the four buffer memories are used for write-in during the DMA cycles. Given write-in and readout of pixel data for the second printhead by words, the two buffer memories 421 and 422 alternate. During the DMA cycles, the DMA controller 43 therefore supplies first and second selection signals Sel__2.1 and Sel__2.2 in alternation for the word-by-word storage of pixel data for the second printhead. For alternating and word-by-word storage of pixel data for the second printhead, for example, the DMA controller 43 supplies a first selection signal Sel__2.1 and an address write signal AW. The number of pixels desired for each print image column requires that a total of 40 data words of 16 bits each be intermediately stored in two of four buffer memories. Circuitry for emitting the second control signal DMA busy and for realizing at least one cycle counter for a predefined number of 16-bit data words is provided in the DMA controller 43.

In the same way (not shown in detail), the binary pixel data for the first printhead are supplied by words via the bus 5 and are at a corresponding data input of the first and second buffer memories 411 and 412 for pixel data for the first printhead. The first pixel data-editing unit 41 (not shown in detail) for the first printhead likewise has first and second buffer memories 411 and 412. Each has an input side connected to the least significant 16 bits of the data bus of the bus 5. The address write signal AW supplied by the DMA controller 43 is at a separate address input of each of the first and second buffer memories 411 and 412 for pixel data for the first printhead. The DMA controller 43 supplies a first selection signal Sel__1.1 for pixel data for the first printhead and applies this to a separate control input of the first buffer memory 411 for pixel data for the first printhead. The DMA controller 43 supplies a second selection signal Sel__1.2 for pixel data for the first printhead and applies this to a separate control input of the second buffer memory 412 for pixel data for the first printhead.

The address read signal AR supplied by the address generator 44 is likewise in turn applied to a separate address input of the first and second buffer memories 411 and 412 for pixel data for the first printhead and to a first selector 413. The parallel data outputs of the first and second buffer memories 411 and 412 for pixel data for the first printhead are connected to first and second inputs of the selector 413. The selector 413, controlled by the address generator 44, supplies a 14-bit parallel signal at its output to the parallel data input of a shift register 414 for pixel data for the first printhead. The shift register 414 is controlled by the shift clock signal SCL of the printer controller 45 and outputs a serial data output signal "serial data out 1."

The address generator 44 includes means for generating an additional address signal AS for switching the selector 413. The switching is maintained until the printer controller 45 outputs an HR signal (with the value "one") as in the case of a high resolution required in the print image.

The printer controller 45 outputs a shift clock SCL to the shift register 414 for pixel data for the first printhead as well as signals latch and Print1 for the control of the pen driver board 11. Via a control line for the output of the signal SO, the printer controller 45 is connected to a corresponding control input of the DMA controller 43 and to the pixel data-editing unit 41.

The cycle counter of the DMA controller 43 is a word counter for a predefined number of 16-bit data words that is started by a DMA start signal. The DMA controller is, for example, a component of an application-specific circuit (ASIC), wherein the cycle counter is connected to the aforementioned circuit for the generation and output of address write signals AW, and to a circuit for the generation and output of selection signals. The latter (not shown) includes at least one output means and first and second comparators. The first comparator drives the output means dependent on the SO signal in order—until a first predefined number of 16-bit data words is reached—to emit a selection signal Sel__1.1 or Sel__1.2 intended for the first pixel data editing unit 41 and in order—after the first pre-defined number of 16bit data words has been reached—to emit a selection signal Sel__2.1 or Sel__2.2 intended for the second pixel data editing unit 42. After a pre-defined number of 40*16-bit data words has been reached, the second comparator generates a DMA busy signal with the value "zero" and is connected to a control line that is connected to the cycle counter in order to end the counting of DMA cycles.

While the pixel data for a data string are being loaded by direct memory access (DMA) into the respective first intermediate memories 411 and 421 and are being intermediately stored therein, the respective second intermediate memories 412 and 422 can be read out. Using the specific address generator 44 and the selectors 413, 423, the binary pixel data are read out from these buffer memories in the sequence required by the printheads, are collected in groups and subsequently serially transmitted to the two printheads by means of shift registers 414, 424. At least one half of a print image column is printed by the first printhead and at least one other half of a print image column is printed by the second printhead.

As a result of this solution, binary pixel data can be stored in the pixel memory in an optimum order that relieves the microprocessor in the modification of the print image. The microprocessor is likewise relieved by the data transmission by DMA.

A data string counter (not shown in detail) is realized in the printer controller 45, each data string containing the aforementioned number of 40*16-bit data words.

After the binary pixel data taken from a data string and edited have been printed, the data string counter is incremented at the occurrence of the left edge of the encoder clock. When a predefined value U has been reached, then the printing of the print image, preferably a franking imprint, is ended.

The printer controller 45, the DMA controller 43, the address generator 44 and the pixel data editing unit 41, 42 are equipped to switch the vertical resolution of the print image. The printer controller 45 is connected in terms of control to the DMA controller 43 in order to supply at least one $F_D$ signal via control line 43 that supplies information about the vertical resolution. The start value H for the $F_D$ signal is written into a register of the printer controller 45 by the microprocessor 6 via data bus 5. The $F_D$ signal is modified when a data string counter reaches a rated value S that corresponds to a predefined position s at a distance from the start of the print image. When the $F_D$ signal having the value "one" is communicated to the DMA controller 43, then the maximum rated value of the word counter is set. Otherwise, all word counter reference values can be halved (FIG. 12), or reduced in a predetermined way. The number of DMA cycles, and thus the busload, thereby is reduced and the CPU has more time available for program processing. Given a modification of variable print image elements, fewer data need to be modified by the CPU between the frankings. The required calculating time is reduced as a result. As warranted, additional memory modules are eliminated, which reduces the manufacturing costs of the machine.

Figure 4:
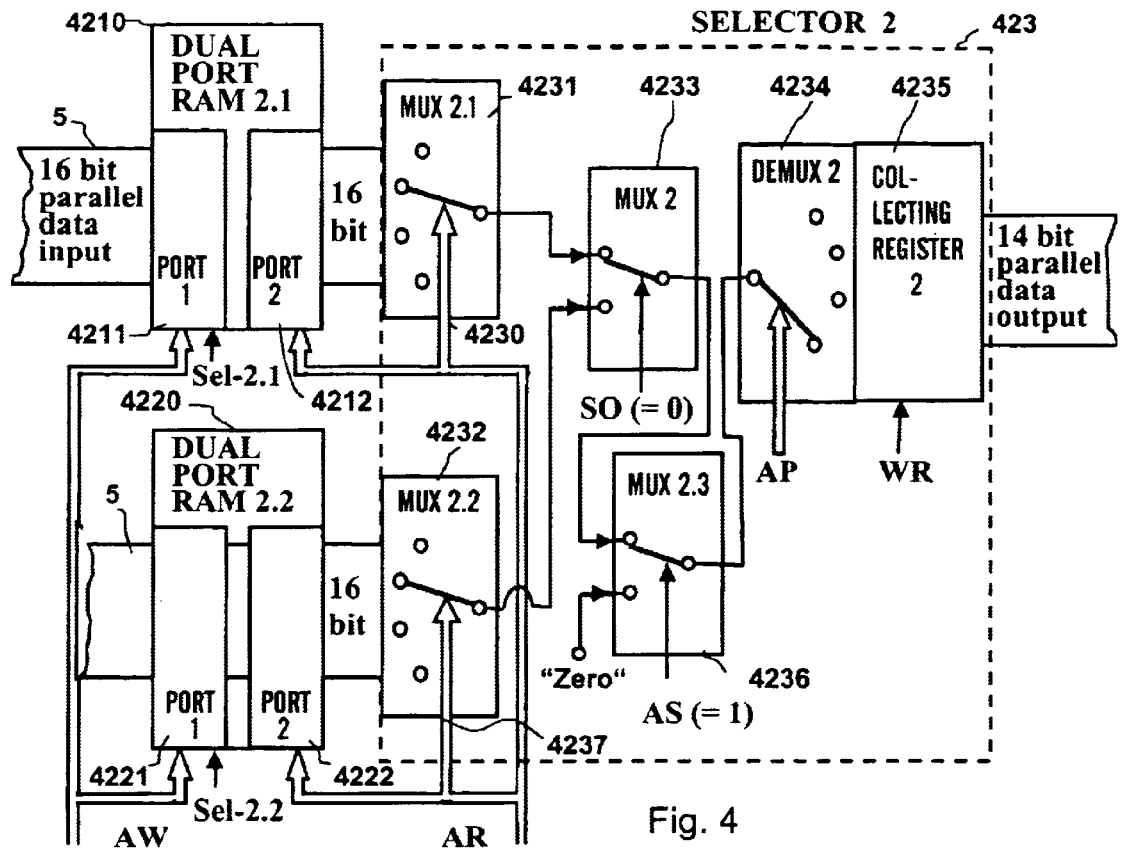
FIG. 4 is a pixel data-editing unit for the second printhead in accordance with the invention.

FIG. 4 shows the pixel data-editing unit for the second printhead in greater detail. The first and second buffer memories 421 and 422 for pixel data for the second printhead are realized, for example, as dual port RAMs 4210 and 4220. The latter are selected for the read-in of the binary pixel data by the first selection signal Sel__2.1 or the second selection signal Sel__2.2 supplied from the DMA controller is to a separate control input of the first port of the first dual port RAM 4210 or the first port of the second dual port RAM 4220. The bits that were previously read in are subsequently read out from the first dual port RAM 4210. To that end, the more significant part of an address read signal AR is applied to the second port 4212, the address read signal AR being supplied from the specific address generator 44. The manner by which the bits are brought into a sequence needed by the second printhead is described below. By means of a first multiplexer 4231, a following, second selector 423 selects a single bit of the binary pixel data from the 16 bits when the least significant part of the address read signal AR is present at its address input 4230, whereby this address read signal AR likewise being supplied by the specific address generator 44. The first multiplexer 4231 following the first dual port RAM 4210 has an output side connected to a first data input of a third multiplexer 4233, and a second multiplexer 4232 following the second dual port RAM 4220 has an output side connected to a second data input of the third multiplexer 4233. A switchover signal SO is at the control input of the third multiplexer 4233, so that, for example, the aforementioned single bit of the binary pixel data is output and supplied to the data input of a following demultiplexer 4234. The multiplexer 4234 is followed by a resettable collecting register 4235 for binary pixel data that has a 14-bit parallel data output. The aforementioned single bit of the binary pixel data is transferred into the collecting register 4235 when a write signal WR is applied to a control input of the collecting register 4235. The multiplexer 4234 is supplied with a primitive address AP that sets the storage location of the bit in the collecting register 4235 and thus ultimately defines the sequence of the location at which the bit resides in the data stream that is serially communicated to the pen driver board 12. The collecting register 4235 successively generates groups of 14-bit binary data at its parallel data output that are communicated to the driver unit (pen driver board) of the ½-inch ink jet printhead. The appertaining primitive address can also be communicated to the driver unit via the shift register (in a way that is not shown). After the communication of a 22nd data group, all of the 300 binary pixel data that a ½-inch ink jet printhead needs have been communicated. The other half of the print image is printed by the first printhead. The pixel data-editing unit for the first printhead is constructed in an identical way. The overall print data controller preferably are realized with an application-specific circuit (ASIC) or programmable logic such as, for example, Spartan-II 2.5V FPGA of XILINX (www.xilinx.com).

Figures 5A, 5B:
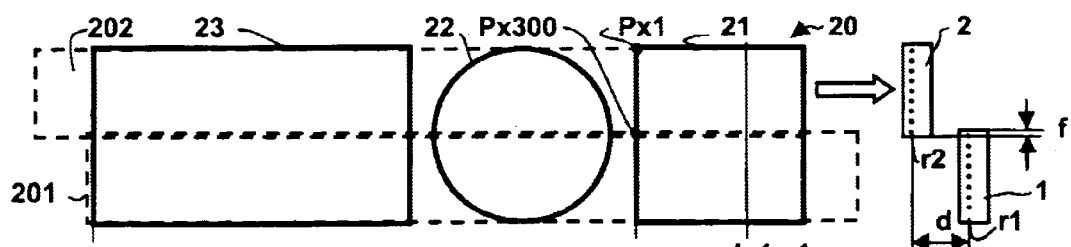
FIG. 5a is a print image for a postage meter machine having two printheads in accordance with the invention.
FIG. 5b is an arrangement of the two printheads for printing a print image in accordance with the invention.

FIG. 5*a* shows a simplified illustration of a print image of a postage meter machine with two printheads. The simplified print image 20 includes a franking stamp image 21, a postmark image 22 and an advertising stamp image 23 that are successively printed given movement of a franking item (not shown) in a transport direction (white arrow). The print image 20 is divided into two parallel regions 201 and 202 that are arranged orthogonally relative to the franking matter transport direction. The printhead 1 prints only the region 201 and the printhead 2 prints only the region 202 when the franking item moves in the transport direction. Each of the two regions 201 and 202 is a half-image of the print image that is intersected by common print image columns 1 through n arranged orthogonally relative to the transport direction.

FIG. 5*b* shows the arrangement of the two printheads for printing the print image onto a surface of a piece of mail that is moved relative to the printheads in transport direction (white arrow). The nozzle rows r1, r2 of the two printheads 1 and 2 are offset from one another by a distance d in transport direction and overlap over a distance f in column direction of the print image. The distance d corresponds to k print image columns. A surface of a piece of mail first enters into the printing region of the second printhead 2, a first number of print image columns 1 through k-1 of the region 202 being printed on this surface. The first printhead 1 prints the first print image column at the same point in time when the k$^{th}$ print image column is printed by the second printhead 2. This offset is taken into consideration in the arrangement of binary pixel data in the pixel memory.

Figure 6:
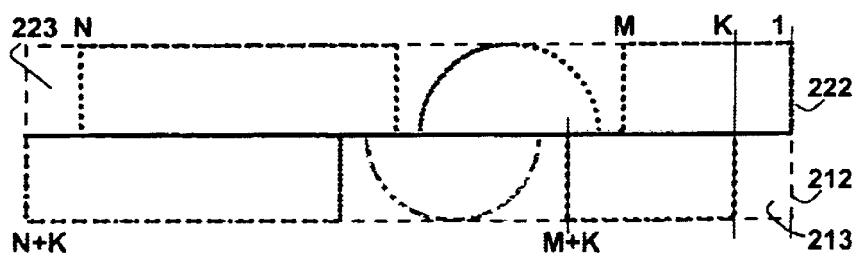
FIG. 6 is an illustration of pixel data from two print half-images in the pixel memory in accordance with the invention.

FIG. 6 shows an illustration of pixel data for two half-images that are stored in the pixel memory. One print half-image is provided for printing with each printhead and is stored completely undistorted in the pixel memory. Only the pixel data having the data value "one" are shown as darkened points. The pixel data having the data value zero are shown as white. It is assumed as a simplification that all nozzles of a printhead lie in a single row that is aligned parallel to a print image column. The presentation of pixel data for the first print half-image begins in position 1. The appertaining pixel data for a simplified print image exist for two print half-images and are shown offset by a distance K, whereby a first region 212 of a presentation of pixel data for the lower half of the print image begins with the data value "zero" for pixel data in the leader 213, and a second region 222 of a presentation of pixel data for the upper half of the print image ends with the data value "zero" for pixel data in the trailer 223. Both, i.e. the leader and trailer, characterize the aforementioned offset that must be taken into consideration in the address space of the pixel memory. Due to the offset, the presentation of pixel data for the second print half-image, which corresponds to the lower half of the print image, does not begin until the position K. A first number of binary pixel data in the presentation of pixel data in a position M lie on a line that corresponds to the position of the print image column m in the second print image region 202 according to FIG. 5*a*. A second number of binary pixel data in the presentation of pixel data in a position M+K, i.e. at a different position offset by K, lie on a line that reflects the print image column m in the first print image region 201 according to FIG. 5*a*.

When two or more nozzle rows per printhead exist, whereby the nozzles of different nozzle rows are offset relative to one another (interlaced), a print image can be printed with a number of pixels that is doubled or even higher. The additional binary data must then be stored in a suitable order in the pixel memory that allows an easy modification of picture elements.

Figures 7, 8:
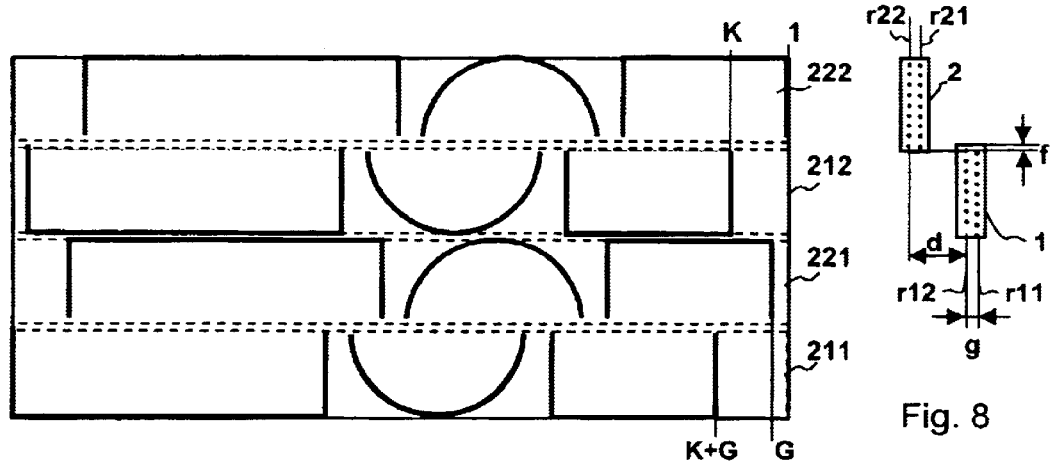
FIG. 7 is an illustration of pixel data for four print half-images in the pixel memory in accordance with the invention.
FIG. 8 is an arrangement of the two printheads for printing the print image with double the resolution in accordance with the invention.

FIG. 7 shows an illustration of pixel data for four print half-images in the pixel memory. For space reasons and clarity, the four print half-images have been shown drawn below one another. In practice, the pixel data for a print image column are arranged, for example, in four successive memory areas. In the illustration, for example, a first area 212 and a second area 222 are provided for the binary pixel data for the respective second nozzle rows per printhead, and a third area 221 and a fourth area 211 are provided for the additional binary pixel data for the respective first nozzle rows per printhead. For simplicity, the binary pixel data of the four print half-images having the data value "one" are shown connected to one another as solid lines. The shape of the picture elements of the print image is preserved in this reflection of the print image by the binary pixel data.

FIG. 8 shows an arrangement of two printheads for printing a print image with double the resolution. Each printhead has two nozzle rows r11 and r12, or r21 and r22, which respectively assume a distance g from one another. Further, a distance f orthogonal to the transport direction is shown wherein the nozzles overlap in the edge region of the nozzle rows of the two printheads. The respective first or second nozzle rows of the two printheads 1 and 2 are parallel to one another. The two printheads 1 and 2 are spaced by a distance d in the transport direction. Given a postal ½-inch ink jet printhead with bubblejet technology that is arranged in a cartridge, for example type HP 5165A of Hewlett Packard, all nozzles having an odd number lie in the nozzle row having an odd number or, respectively, all nozzles having an even number lie in the nozzle row having an even number.

Due to the aforementioned offset d of the printheads 1, 2 in the transport direction, the presentation (shown in FIG. 7) of pixel data for the first print half-image to be printed by the second nozzle row r12 of the first printhead 1 does not begin until position K.

Due to the aforementioned offset of the respective nozzle rows r11, r12 and r21, r22 of the printheads 1, 2, the presentation (shown in FIG. 7) of pixel data for the third print half-image to be printed by the first nozzle row r21 of the second printhead does not begin until position G.

Due to the aforementioned offset of the printheads 1, 2 in the transport direction and the aforementioned offset of the nozzle rows of each of the printheads, the presentation (shown in FIG. 7) of pixel data for the first print half-image to be printed by the first nozzle row r11 of the first printhead does not begin until position K+G.

Further sequences of binary data in the pixel memory that allow an easy modification of picture elements are possible.

Figures 9A, 9B:
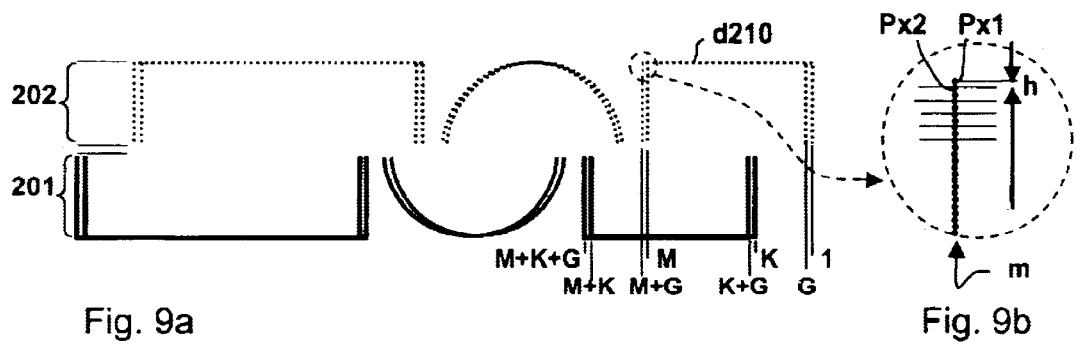
FIG. 9a is an illustration of pixel data for four print half-images in the pixel memory in a preferred arrangement thereof in accordance with the invention.
FIG. 9b is an illustration for the column-by-column printing of pixels in accordance with the invention.

FIG. 9a shows an illustration of pixel data for four print half-images in the pixel memory for a preferred arrangement of the pixel data. A data string of binary pixel data from the pixel memory composed of 20 successive data words each having 16 binary pixels yields an identical map of the pixels with even numbers of a first print image column and of the pixels with odd numbers of a second print image column that are printed onto an approximately ½-inch width by an ink jet printhead having two nozzle rows.

A pattern with such data strings arranged in columns—as shown in FIG. 9a—thus yields an identical map of the part of the franking stamp print image printed by an ink jet printhead with a width of approximately ½-inch. The binary pixel data that are printed by the same printhead lie in one and the same region 201 or 202 and are presented in neighboring data strings arranged column-by-column. The same, aforementioned ordering of the data strings applies in both regions. The binary pixel data for print half-images that can be allocated to different nozzle rows of the same printhead are arranged in mutually offset positions in the same region 201 or 202 in the presentation, i.e. the binary pixel data of the print half-images of a half of the print image can be arranged successively interlaced or interleaved in the pixel memory. The presentation of the binary pixel data of the two print half-images for the two nozzle rows of the same printhead is shown dotted in a region 202 that reflects the upper half of the print image. Each dot is intended to reflect a binary pixel datum with the data value "one." The binary pixel data for the nozzles of the nozzle row with an even number or the binary pixel data for the nozzles with an even number lie in the data string that is shown at the first position and have, for example, the data value "one." The binary pixel data for the nozzles of the nozzle row with an odd number or the binary pixel data for the nozzles with an odd number that lie in the data string that is shown at the first position have, for example, the data value "zero."

The binary pixel data for the nozzles of the nozzle row having an odd number or the binary pixel data for the nozzles having an odd number lie in the data string that is shown at the position G and have, for example, the data value "one." The binary pixel data for the nozzles of the nozzle row having an even number or the binary pixel data for nozzles having an even number that lie in the data string that is shown at the position G have, for example, the data value "zero." Although the binary pixel data d210 of the frame of the franking stamp image are stored in mutually offset positions (for example, M and M+G) for the two print half-images, when printing a print image column (for example, m) they are printed at different points in time as two rows of pixels that (ideally) lie above one another, so that the two practically produce a single line in the print image column direction after the printing. Only for distinguishing the reflection of the lower half of the print image, a solid, thick line is employed in a further region 201 of FIG. 9a in order to also show the binary pixel data of the two print half-images for the two nozzle rows of the other printhead as a simple pattern.

The illustration for the column-by-column printing of pixels in FIG. 9b shows a print image column n into which both aforementioned rows of pixels fall. A first nozzle row r1 prints a first pixel Px1, and a second column row r2 prints a first pixel Px2 that exhibit a spacing h orthogonal to the transport direction. Binary pixel data for nozzles with odd or even numbers exist in the pixel memory for such a print image column. 32 bits are stored per data word. Respective addresses are allocated to these data words.

Figures 10A, 10B, 10C:
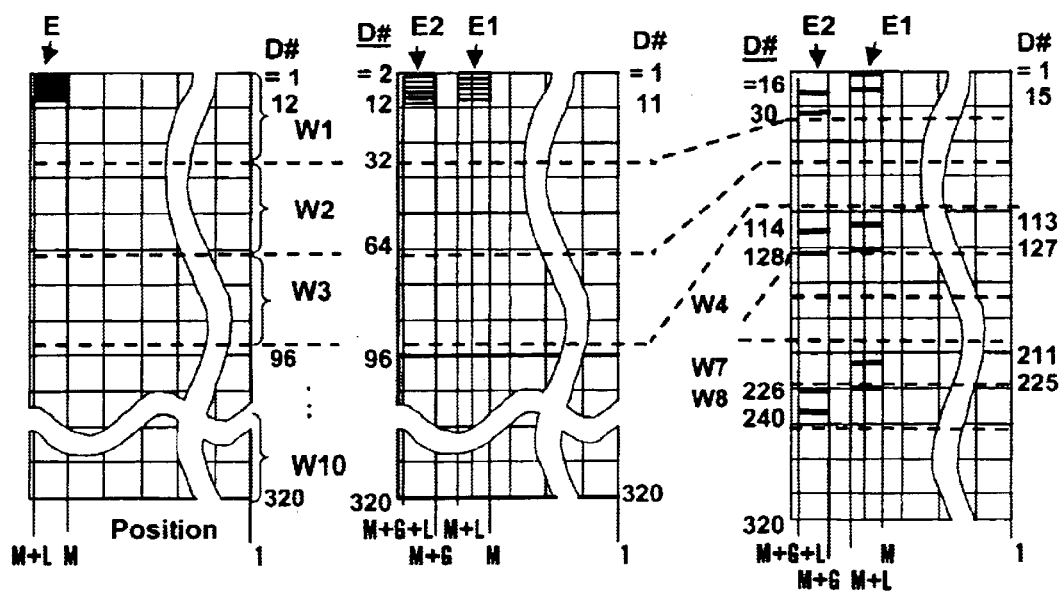
FIG. 10a is an illustration of the binary pixel data of a picture element that are stored in a pixel memory in accordance with the invention.
FIG. 10b is an illustration of the binary pixel data of a picture element that are stored in divided form in the pixel memory in accordance with the invention.
FIG. 10c is an illustration of the binary pixel data of a picture element in the pixel memory that are stored in a known way.

FIG. 10a shows an illustration of the binary pixel data of a picture element for an arrangement of two printheads with only one nozzle row, corresponding to FIG. 5b. The binary pixel data are stored in a sub-area of the pixel memory. For a map E of a picture element, those binary pixel data that have the value "one" are shown as black picture elements. The value "zero" is not shown in black. Ten data words W1 through W10 of respectively 32-bit binary data form a data string with binary pixel data that are required for printing a print image column with one nozzle row. A first data string of 320 binary pixel data is shown by means of white dots at the right in FIG. 10a, these lying in the position 1 on a row. The binary pixel data of the first data string are consecutively numbered from the data number D#=1 through the data number D#=320 and have the value "zero."

For space reasons, the presentation ends with a data string at the position M+L, and only a region addressable with the respectively first three data words W1, W2 and W3 of a data string has been shown interconnected, only approximately one-third of the binary pixel data required for 300 nozzles being addressable therewith. This, however, is not intended to represent a limitation for a presentation of data strings. A practical limitation exists only from the maximum number of data words that are storable in a pixel memory. The numbering of the binary pixel data employed in the illustration corresponds to the numbering of the nozzles in a nozzle row and begins with the number one in the first group for each data string. The numbering of the binary pixel data of the tenth group ends with the number 320. This repeats for each data string until the position m has been reached. As was explained on the basis of the arrangement (shown in FIG. 6) of binary pixel data for two print half-images in the pixel memory, the picture element E already can be addressed by means of a first data word W1. This repeats up to the position M+L and—because each binary value "one" is shown as a black dot—the map E of the picture element as a black box thus arises. Given twelve first binary pixel data having the value "one" for a number of data strings from the position M up to the position M+L, whereby L is assumed to be equal to 6, the aforementioned black box is printed by one of the two printheads with a single nozzle as a pixel field that is 12 pixels long and 6 pixels wide and that has a resolution of 600*300 dpi. For example, a data matrix code has 48×48 picture elements.

Since such ink jet printheads with only one nozzle row and with the required resolution are not always available, the illustration in FIG. 10b refers to commercially available, postal ½-inch ink cartridges of the type HP51645A of Hewlett Packard. These have two nozzle rows per ink jet printhead. For example, an imprint with a resolution of 300 dpi in the transport direction and with a resolution of 600 dpi in the direction orthogonal to the latter is enabled on a one-inch wide tape with the ink jet printheads of this type—in the arrangement shown in FIG. 8.

FIG. 10b shows an illustration of the binary pixel data of a picture element that is advantageously stored divided in the pixel memory. The binary pixel data of a picture element for the nozzles having an even number D# and for the nozzles having an odd number D# lie in different data strings in what is always a data word of equal rank.

The binary pixel data with the data value "one" for the nozzles of the nozzle row having an even or, respectively, odd number or—stated differently—for the odd or, respectively, even numbers of the nozzles form a respective maps E1 and E2 of the picture element. In the present example, both maps E1 and E2 lie in the first data word of different data strings. The binary pixel data having the data value "one" for the nozzles of the nozzle row having an even or odd number or—stated differently—for the odd or even numbers of the nozzles lie in data strings at the position M≦E1≦position M+L or, respectively, at the position M+G≦E2≦position M+G+L. The binary pixel data with the data value "one" and with the same data number of immediately adjacent data strings were shown not as a dot but as a thick black stroke only for illustration.

Again for space reasons, only a region addressable with the respectively first three data words W1, W2 and W3 of a data string has been shown interconnected, this sufficing for an illustration of the binary pixel data of the maps E1, E2 of the picture element.

In both illustrations of FIGS. 10a and 10b, the stored binary pixel data of a picture element respectively lie within a 32-bit data word W1. Advantageously, no further 32-bit data words need to be called, particularly when variable picture elements are varied from imprint to imprint. Computing time of the microprocessor is thus saved. Preferably, thus, an ordering is organized in the pixel memory that was already explained in conjunction with FIG. 9a and that makes it possible to reduce the number of data words that must be called by the microprocessor in order to modify a picture element.

FIG. 10c shows an illustration of the binary pixel data of a picture element in the pixel memory that are stored in a known way, whereby the pixel data are arranged in the pixel memory so as to be successively read out when printing. For reflecting the picture element, a map E2 of binary pixel data with even data numbers D# and a map E1 of binary pixel data with odd data number D# are again present, with the binary pixel data having the data value "one" and with the same data number being shown as a thick, black stroke. Differing from the illustrations shown in FIGS. 10a and b, the even data numbers D# and odd data numbers D# of the stored binary pixel data in the illustration according to FIG. 10c no longer have the same numbers as the driven, allocated nozzles of a printhead. The data numbers D#=0 through 240 were indicated for illustrating the binary data that are used for a printing of the aforementioned picture element. The picture element is printed out by the appertaining nozzles D1 through D12 of a printhead. The scale of the illustration has to be reduced for space reasons in order to illustrate the increased outlay when accessing the stored binary pixel data that the microprocessor must access given a modification of only one picture element in the print image. The increased outlay is also caused by the data words W1, W4, W7 and W8 that lie far apart. It is clear that the computing time of the microprocessor is greater when the stored binary pixel data of a picture element are distributed according to a complicated pattern, or lie far apart in data words that are not of equal rank, so that many steps are required in order to implement a modification of a picture element or in the pattern of the print image.

Figure 11:
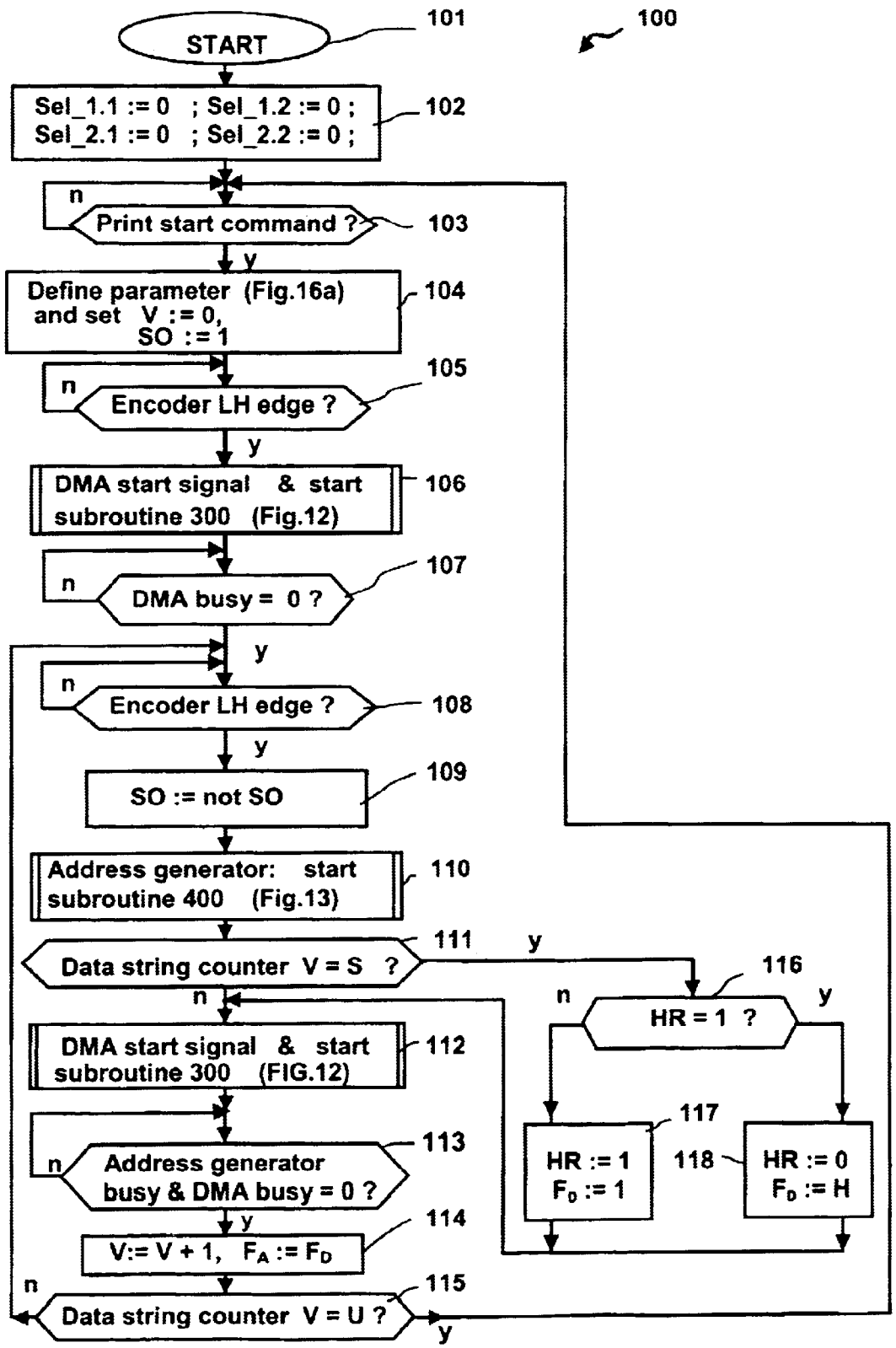
FIG. 11 is a flowchart of the executive sequence control of the printer controller in accordance with the invention.

FIG. 11 shows a flowchart of the executive sequence control of the printer controller. After the activation in step 101, a step 102 is reached, and all selection signals Sel_1.1, Sel_1.2, Sel_2.1, Sel_2.2 are set to the value "zero" in the routine 100 of the executive sequence control. In a first interrogation step 103, a data word communicated via a bus is evaluated in view of the occurrence of a command to start printing. When this command has not yet been given, then a branch is made into a waiting list. After the start of printing a setting of the column count value V to the value "zero" ensues in a step 104. The switchover signal SO is set to the value "one" and output. An HR variable switchable between two values is also set to an initial value HRS that is present in a register of the print controller. In step 104, the HR start value and compression or, respectively, decompression factors $F_D$ or, respectively, $F_A$ derived therefrom are stored in registers of the printer controller, which shall be explained in greater detail with reference to FIGS. 16a, b. Corresponding to the example discussed on the basis of FIG. 1d, let HR:=0 apply given a compression factor of $F_D$=2. The corresponding registers with the $F_D$ or, respectively, $F_A$ variables are queried in the subroutines 106 and 112 or, respectively, 110.

In a second interrogation step 105, the encoder signal e is evaluated in view of the occurrence of a left edge. If this has not yet appeared, then a branch is made into a waiting loop. Otherwise, a signal DMA start is output in a step 106, and a sub-routine 300 is started that sets specific selection signals Sel_1.1, Sel_1.2, Sel_2.1 or Sel_2.2 to the value "one" in order to transfer the binary pixel data into the buffer memories of the pixel data editing units 41 and 42, which shall be explained in even greater detail later on the basis of FIG. 12.

In a third interrogation step 107, the DMA busy signal is evaluated to determine whether it has been set to the value "zero." If this is not yet the case, then a branch is made into a waiting list. If, however, the DMA busy signal has been set to the value "zero", then a fourth interrogation step is reached wherein the encoder signal is evaluated as to the occurrence of a left edge. If this has not yet appeared, then a branch is made into a waiting list. Otherwise, the switchover signal SO is logically negated in a step 109 and then output. Subsequently, the address generator is activated in a step 110, and a subroutine is started that generates read addresses AR intended for the pixel data editing units 41 and 42 and control signals such as the switchover signal SO, the primitive address AP, the write signal WR and a load signal LD. In step 111, a DMA start signal is output and the DMA controller is activated for renewed starting of the sub-routine 300. The two sub-routines 300 and 400 are executed parallel to one another. In the fifth interrogation step 111, the data string count value V is interrogated to determine whether the latter has reached the rated value S. This corresponds to a position 5 in the print image that is allocated to the rated value S (FIG. 1e). A branch is made to the step 112 when the data string count value V has not yet reached the rated value. In step 112, a DMA start signal is output and the DMA controller is activated for renewed starting of the sub-routine 300. The DMA controller 43 and the address generator 44 operate independently of one another, i.e. the two sub-routines 300 and 400 sequence in parallel with each another. In a sixth interrogation step 113, an evaluation is made as to whether the DMA controller 43 and the address generator have ended their work (subroutine 400). This is the case when both the DMA-busy and the AG-busy signal have been set to the value "zero." If this is not yet the case, then a branch is made into a waiting list. When, however, the address generator has finished with its work (sub-routine 400) and the AG-busy signal has been set to the value "zero", then a step 114 is reached. In step 114, the data string count value is incremented V:=V+1 and factor $F_A$ is set equal to $F_D$. In the following, seventh query step 115, an evaluation is made as to whether the column count number V has reached a limit value U. If this is not yet the case, then a branch is made to the fourth interrogation step 108. Otherwise, a branch is made to the first query step 103 and the routine begins anew when a print start command is found in the first query step 103.

When it is found in the fifth interrogation step 111 that the data string count value V has reached the rated value S, then a branch is made to an eighth interrogation step 116 in order to evaluate the HR register and modify it in a following step 117 or 118. If the previous value HR:=0 does not meet the demand HR=1, then—in step 117—the HR register is set from the value HR:=0 to the to the current value HR:=1 and the $F_D$ register is set from the value $F_D$:=2 to the current value at $F_D$:=1. The address generator then operates with a decompression factor $F_A$ that differs in value from the value of the compression factor $F_D$ for the following data string to be loaded into the buffer memories. For example, the $F_A$ variable still has the initial value $F_A$:=2 but the $F_D$ variable was already set to the current value at $F_D$:=1. After both the address generator 44 and the DMA controller 43 have ended their work, then—in step 114—the value of the compression factor $F_A$ is additionally set to the value of the compression factor $F_D$ before or after the data string count value is incremented V:=V+1. Alternatively, it is possible for the print image to be printed with high resolution from the very start and to make a switch to low resolution after the position s. Then the step 118 is reached when the assumption that the previous start value was HR:+1 was correct. In step 118, the $F_D$ variable is set from a value, for example $F_D$:+1, to the current value at $F_D$:=H, whereby the value of H is equal to 2, 4, . . . Subsequently, a branch is made from the steps 117 or 118 to the step 112 in order to output a DMA start signal.

There is a transition region in the print image wherein printing can be carried out with high resolution but low resolution is simulated. Correspondingly diluted print image data for high resolution are stored in the flash pixel memory 7. The microprocessor accesses print image data that have already been correspondingly diluted in order to generate or modify the data strings in the pixel memory 7. The viewer of the print image shown in FIG. 1c therefore does not get the impression that the resolution in the print image was already switched from position s. This early switching, however, is required because the offset between the two nozzle rows within the same printhead, and the offset between the two printheads, must be taken into consideration in the generation of the binary pixel data for the print image, this proceeding from FIG. 9a. The pixel data of an odd nozzle number lie in a different print column in the print image from the pixel data with an even nozzle number even though the pixel data belong to one data string and are printed out in common in the same time segment. In the print image, the pixel data with odd and even nozzle numbers intended for the second printhead are printed in two further print columns. A gradual transition between high resolution and low resolution and vice versa in the print image can be generated in the transition region.

Figure 12A:
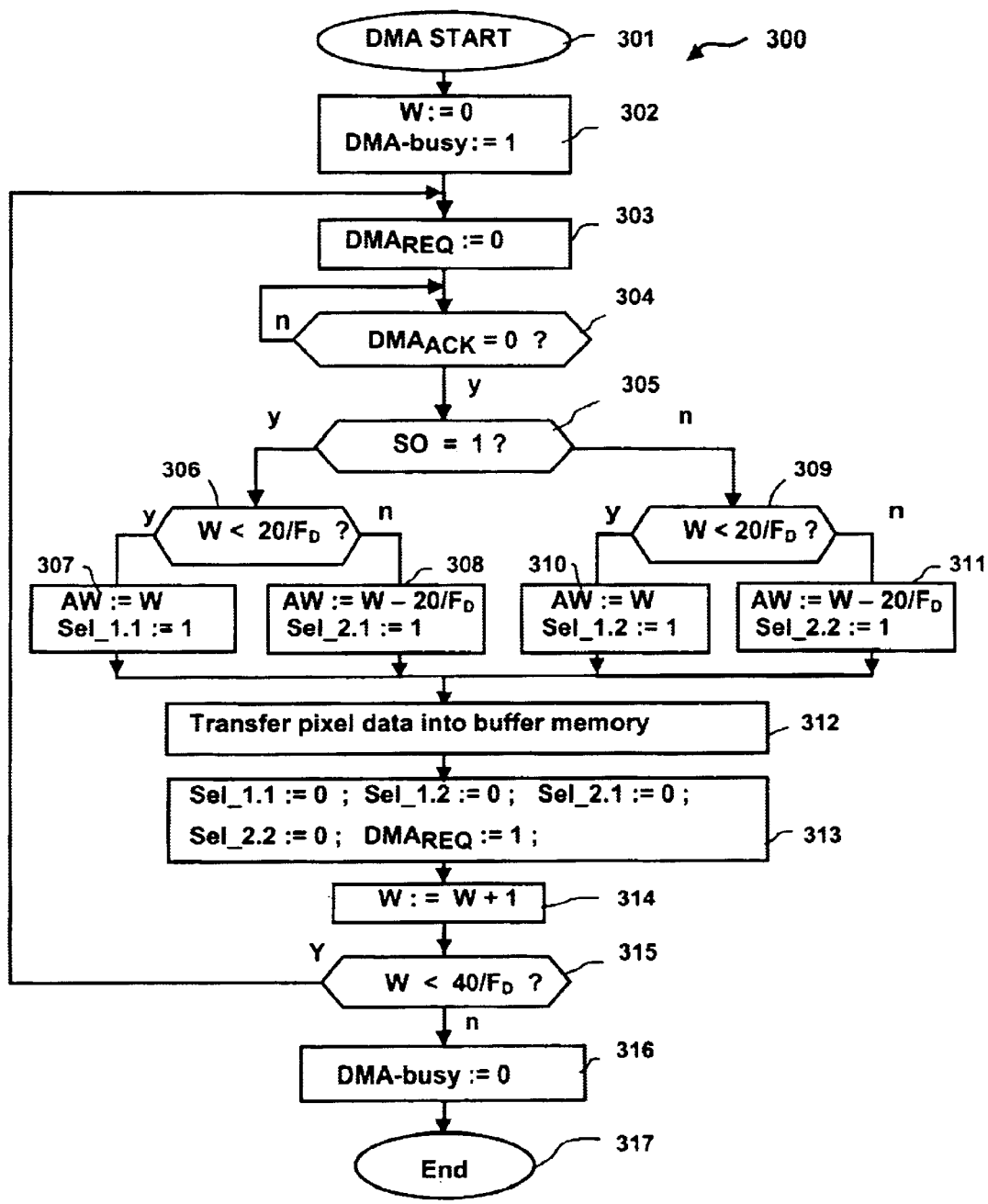
FIGS. 12a and 12b are a flowchart and block circuit diagram, respectively, for the DMA controller in accordance with the invention.

FIG. 12a shows a flowchart for the DMA controller. Such a sub-routine 300 is called when the printer controller 45 outputs a DMA start signal to the DMA controller 43 (step 301). A word count value W is set the value "zero" in a step 302 of the sub-routine 300. A DMA busy signal is set to the value "one" and communicated to the printer controller 45. A DMA request signal $DMA_{REQ}$ having a value "zero" is communicated to the microprocessor 6 in a further step 303 of the sub-routine 300. Said microprocessor 6 communicates an acknowledge signal $DMA_{ACK}$ to the DMA controller 43. In a first interrogation step 304 of the subroutine 300, a branch is made into a waiting list given non-reception of the acknowledge signal $DMA_{ACK}$ with a value "zero." Upon reception of the acknowledge signal $DMA_{ACK}$ with a value "zero", a further branch is made from the first interrogation step 304 of the sub-routine 300 to a second interrogation step 305, whereby the status of the switchover signal SO is determined. When the switchover signal SO has the status equal to "one", then a branch is made to a third interrogation step 306. Otherwise, the switchover signal SO has the status equal to "zero", and a branch is made to a fourth interrogation step 309. A check is carried out in the third interrogation step 306 as to whether the word counter exhibits a value W of less than twenty. In this case (W<20/$F_D$), a branch is made to a step 307. In step 307, the first selection signal for the first printhead Sel__1.1 is switched to the value "one", and the address write signal AW receives the current value W of the word counter. In the following step 312, the pixel data are transferred into the buffer memories of the pixel data-editing units 41, 42. In step 313, subsequently, all selection signals are switched to the value "zero", and a DMA request signal $DMA_{REQ}$ having a value "one" is communicated to the microprocessor 6.

In step 314, the word count value W is incremented with the value "one." A check is made in a subsequent interrogation step 315 to determine whether the word counter exhibits a value W less than forty, In this case wherein the word counter exhibits a value W<40/$F_D$, a branch is made back to a step 308. Otherwise, a branch is made to a step 316 in order to output a signal DMA busy before the end (step 317) of the sub-routine 300 has been reached.

Otherwise, i.e. if it is determined in the third interrogation step 306 that the word count value W is not less then twenty, divided by the $F_D$ variable a branch is made to a step 308 in which the first selection signal for the second printhead Sel__2.1 is switched to the value "one", and the address write signal AW receives the current value W of the word counter minus the value "twenty divided by the $F_D$ variable." In the following step 312, the pixel data are again transferred into the buffer memory.

A check is likewise made in the aforementioned fourth interrogation step 309 to determine whether the word counter exhibits the value W<20/$F_D$, even if it was found previously in the interrogation step 305 that the switchover signal SO does not exhibit the status equal to one. When the word counter exhibits the value W<20/$F_D$, then the second selection signal for the first printhead Sel__1.2 is switched to the value "one" in the step 310, and the address write signal AW receives the current value W of the word counter. The pixel data are again transferred into the buffer memory in the following step 312.

Otherwise, if the word counter does not exhibit the value W<20$F_D$, a branch is made from the fourth query step 309 to a step 311 wherein the second selection signal for the second printhead Sel__2.2 is switched to the value "one", and the address write signal AW receives the current value W of the word counter minus the value of the quotient "twenty divided by $F_D$." The pixel data again are transferred into the buffer memory in the following step 312.

Figure 12B:
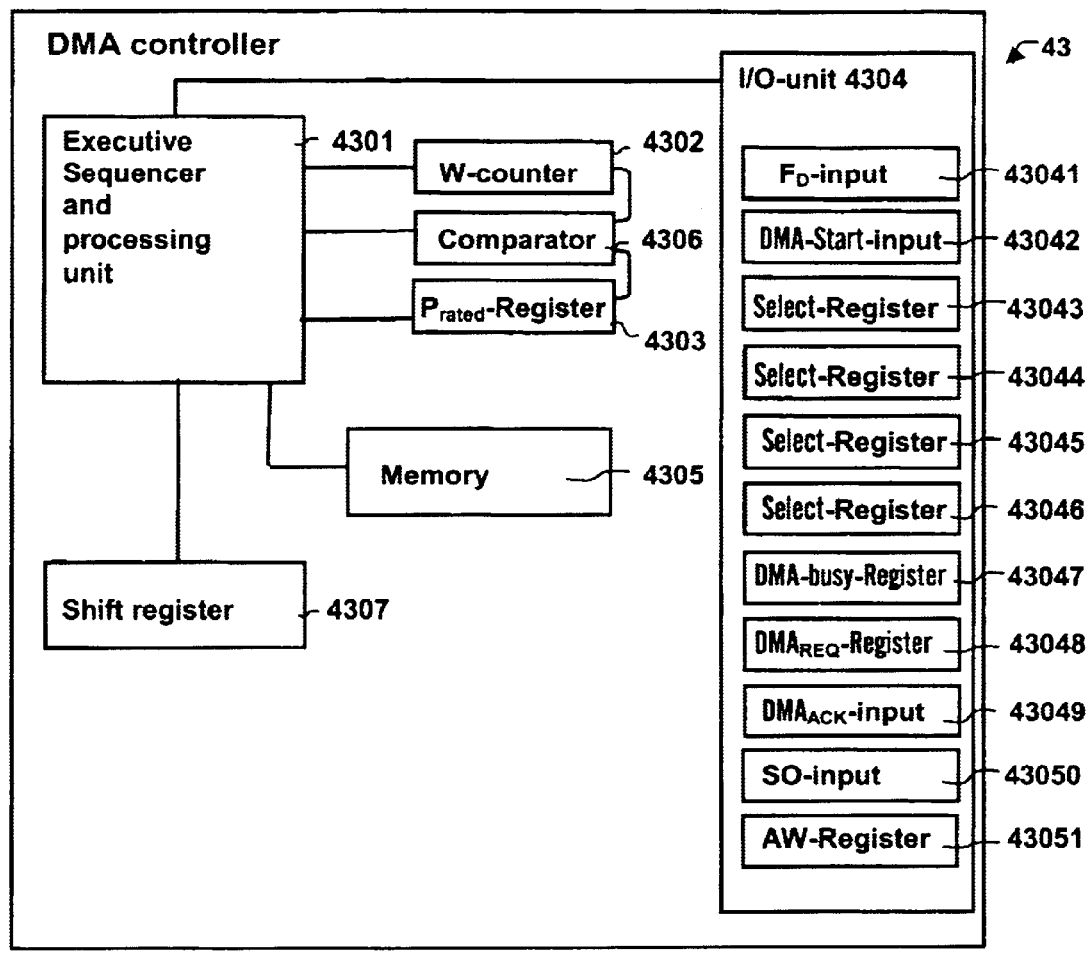

FIG. 12b shows a block circuit diagram of a DMA controller. The DMA controller 43 has at least one executive sequencer 4301, a word counter 4302, a reference value register 4303, an input/output logic 4304, a memory 4305, a comparator 4306 and a shift register 4307 that are interconnected to one another in order to implement DMA cycles. A further processing unit to which the aforementioned blocks 4302 through 4307 are connected in terms of circuitry can be integrated into the executive sequencer 4301. The aforementioned switching of the number of data words can ensue with a shift register, since a place shift of binary numbers corresponds to a division by the number two and a further place shift corresponds to a division by the divisor four derived from the number two. In order to assure the signal flow within the print data controller 4 and between the DMA controller 43 and the print data controller 6, the input/output logic 4304 has at least an input 43041 for the communicated compression factor $F_D$, an input for the received DMA start signal and registers 43043 through 43046 for the select signals to be transmitted, a register 43047 for the DMA-busy signal to be transmitted, a register 43048 for the request signal $DMA_{REQ}$ to be transmitted, an input 43049 for the received acknowledge signal $DMA_{ACK}$, an input 43050 for the switchover signal (SO) and register 43051 for the address write signal AW. The type of logic of the specific embodiment of the DMA controller can be arbitrarily selected, and their are a number of suitable versions. A hardware realization of the DMA controller from known components is possible with, for example an ASIC or—advantageously—with an FPGA (field programmable gate array).

Figure 13A:
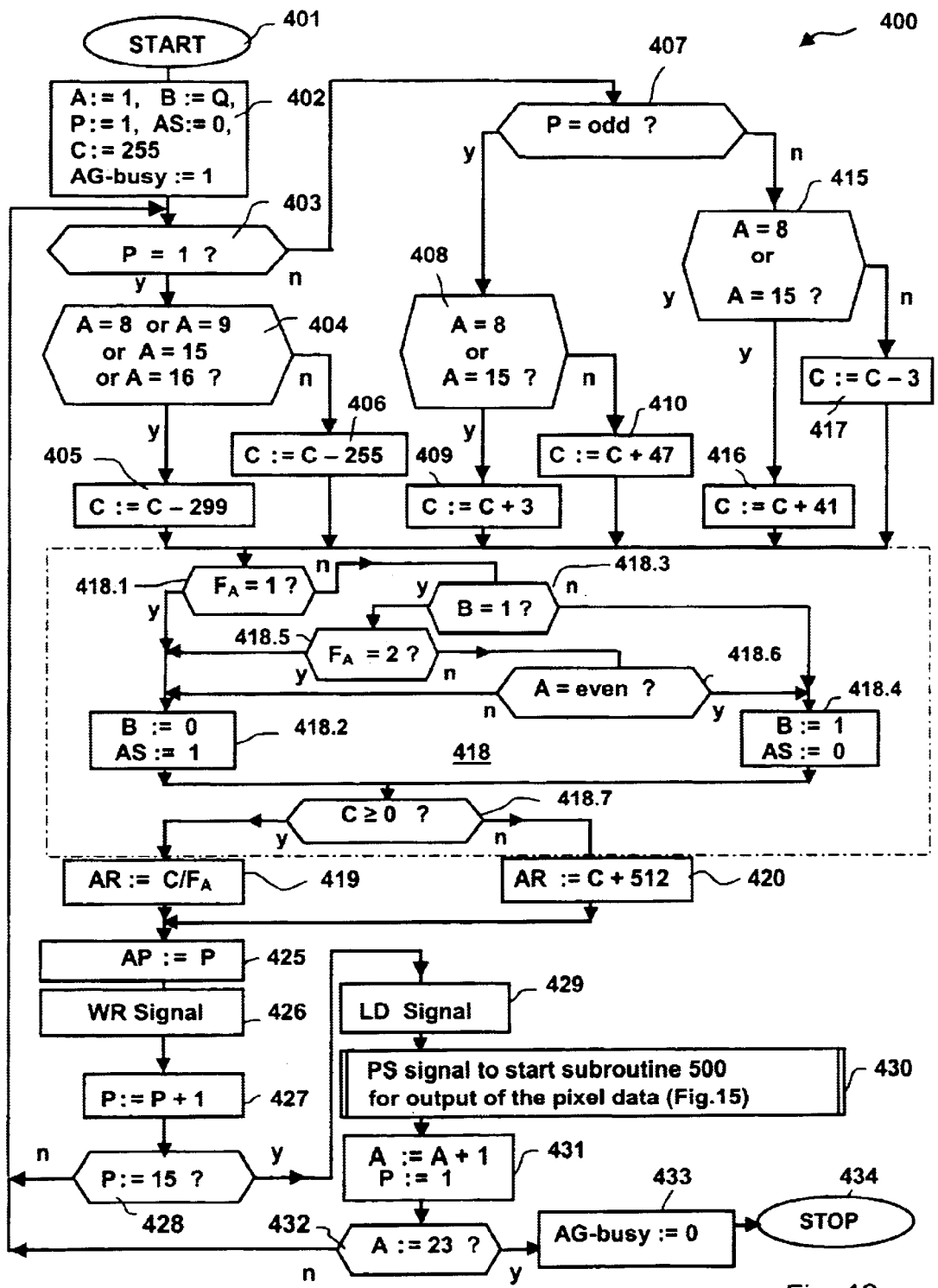
FIGS. 13a and 13b are a flowchart and block circuit diagram, respectively, for the address generation in accordance with the invention.

FIG. 13a shows a flowchart for the address generation. The addresses of stored binary pixel data at both printheads begin with the start address "zero", which is generated in the following way for the address read signal AR. After the start in step 401, the start values are called in step 402, A:=1 for a counter of the address group, B:=Q for a register for the selection of one of the two nozzle rows of each printhead when printing with low resolution, P:=1 for a counter of the primitive address AP, AS:=0 for an additional address signal and C:=255 for a counter of the address read signal AR. A register for the AG-busy signal is set to the value "one."

After a first address read signal AR having the value "zero", the address generator 44 successively generates further address read signals AR with other predetermined values. Given low resolution, some of the generated addresses are ignored or selected. A variable B in the register can be set to different start values Q=1 or Q=0 for the selection.

When a binary pixel datum intended for the first nozzle number is to be transferred into the shift register, then a start value Q equal to "zero" is selected for the register for B, and a first address read signal AR having the value "zero" is generated. The steps 403, 404, 406 and 418 are executed in such a case. The first interrogation step 403 asks whether the numerical value P of the counter of the primitive address is equal to the value "one." If this is the case, then the second interrogation step 404 is reached. A determination is made therein as to whether the counter A has reached the value 8 or 9 or 15 or 16. If this is the case, then the step 406 is implemented, and the numerical value 255 is subtracted from the numerical value C of the counter of the address read signal AR. In the third interrogation step 418.1, thus, a determination is made as to whether the decompression factor $F_A$ is equal to the value "one." This is always the case given high resolution, and the sub-step 418.2 is reached wherein the register for B is set to the value "zero" and the additional address signal As is modified to the value "one", causing the fourth multiplexer 4236 in the selector 423 for binary pixel data to be switched to through-connect. Following the first address read signal AR, further address read signals AR with other predetermined values are generated. Given low resolution, a selection can be made by means of a corresponding selection of the value Q as to whether the generated read addresses that can be allocated to even-numbered primitive addresses should be ignored or selected in order to generate an address read signal AR. When the value Q is set to the value "zero" at the start, then each of the generated read addresses that can be allocated to even-numbered primitive addresses P is selected. When the value Q is set to the value "one" at the start, then each of the generated read addresses that can be allocated to the odd-numbered primitive addresses is selected.

If it was found in the third interrogation step 418.1 that the decompression factor $F_A$ is not equal to the value "one", then a branch is made to the interrogation step 418.3 and a check is made to determine whether the variable B is equal to the value "one." In such a case, the decompression factor can be $F_A$=2 or 4, for which reason a branch is made to a further interrogation step 418.5 and a check is made to determine whether the decompression factor $F_A$ is equal to the value "two." If this is the case, a branch is made to the sub-step 418.2 wherein the register for B is set to the value "zero" and the additional address signal AS is modified to the value "one," causing the fourth multiplexer 4236 in the selector 423 for binary pixel data to be set to through-connect. If this is not the case, i.e. the decompression factor $F_A$ is equal to the value "flour," then a branch is made to the interrogation step 418.6 wherein a determination is made as to whether a count value A for the address group is even-numbered. Given an odd-numbered count value A, a branch is again made to the sub-step 418.2. Otherwise, a branch is made to the sub-step 418.4. Sub-step 418.4 also is reached if it is found in the interrogation step 418.3 that the register for B is no equal to the value "one." In step 418.4, the register for B is set to the value "one" and the additional address signal AS is modified to the value "zero." As a result, the fourth multiplexer 4236 in the selector 423 is switched to the switch status (not the status shown in FIG. 4) and emits a binary pixel datum having the value "zero" at its output. The sub-step 418.7 serves for the selection of read addresses by making a determination as to whether the numerical value C of the counter of the address read signal AR is greater than/equal to the value "zero." If so, a branch is made to the step 419 for the output of the address read signal AR:=1. Otherwise, a negative numerical value is present and a branch is made to the step 420 in order to add a numerical value 512 to the negative numerical value. The steps 425, 426 and 427 are executed after the steps 419 and 420.

The numerical value for the counter of the primitive address AP is emitted in step 425. A write signal WR for the entry of the binary pixel datum into a collecting register is then emitted in step 426. The numerical value for the counter of the primitive address AP is incremented by the value one in step 427. A further interrogation step 428 has then been reached, and a determination is made that the numerical value P of the counter of the primitive address AP has not yet reached the limit value 15. Subsequently, a branch is made back to the first interrogation step 403.

A finding is then made in the first interrogation step 403 that the numerical value P of the counter of the primitive address is not equal to the value one and a branch is made to the sixth interrogation step 407. If the numerical value P is odd, then a branch is made to the seventh interrogation step 408 in which a check is made to determine whether the counter of the address group has the value 8 or 15. If this is the case, then a branch is made to a step 409, and the numerical value 3 is added to the numerical value C of the counter of the address read signal AR. Otherwise, a branch is made from the seventh interrogation step 408 to a step 410, and the numerical value 47 is added to the numerical value C of the counter of the address read signal AR.

If the numerical value P is even, then a branch is made from the sixth interrogation step 407 to the eighth interrogation step 415 wherein a check is made to determine whether the counter of the address group has the value 8 or 15. If this is the case, a branch is made to a step 416, and the numerical value 41 is added to the numerical value C of the counter of the address read signal AR. Otherwise, a branch is made from the eighth interrogation step 415 to a step 417, and the numerical value 3 is subtracted from the numerical value C of the counter of the address read signal AR.

Proceeding from the steps 405, 406, 409, 410, 416 and 417, the third interrogation step 418.1 is reached again and a determination is made that, for example, low resolution was selected at the start, i.e. the decompression factor $F_A$ was selected unequal to the value "one." Subsequently, the interrogation step 418.3 is reached again and it is found that the register for the variable B is set, for example, to the value "zero", i.e. is not equal to the value "one." A branch is then made to the step 418.4 and the additional address signal AS is modified to the value "Zero," causing the fourth multiplexer 4236 in the selector 423 to be switched.

Thus if low resolution was selected at the start with $F_A \neq 1$ and the value Q=0 was correspondingly selected, all of those generated addresses that can be allocated to the respective odd-numbered primitive addresses are ignored and the fourth multiplexer 4236 in the selector 423, which is then switched into the switch status that is not shown in FIG. 4, emits a binary pixel datum with the value "zero" at its output. Moreover, the register for B is set to the value "one" in sub-step 418.4.

Proceeding from the aforementioned steps 405, 406, 409, 410, 416 and 417, the interrogation step 418.7 is reached again and a determination is made as to whether the numerical value C of the counter of the address read signal AR is greater than/equal to the value zero. For example, a positive numerical value C=44 was determined as the result of a third pass through the routine 400. An address read signal AR is generated in step 419 that corresponds to the quotient of the positive numerical value (C=44) and the decompression factor ($F_A$=2). The logic in the address generator 44 generates each numerical value (C=44) as a binary number (101100) and contains shift registers for quotient formation, the latter being undertaken with an even-numbered factor (2 or 4) for the case of a low resolution. The binary number with the same digit sequence but shifted one place toward the right (010110) corresponds to a quotient formed with the factor 2 (C/2=22). A binary number (001011) shifted two places toward the right corresponds to a quotient formed with the factor 4 (C/4=11). A binary number (101100) not shifted by any place toward the right corresponds to a quotient formed with the factor 1 (C/1=44), which applies to the case of a high resolution ($F_A$=1).

Following the steps 419 and 420, the steps 425, 426 and 427 are executed again until the fifth interrogation step 428 has been reached, a determination being made therein as to whether the numerical value P of the counter of the primitive address AP has already reached the limit value 15. If so, then a branch is made to a step 429 and a load signal for loading the shift register is output. In order to print the pixel data out, a PS signal is output instep 430 and a sub-routine 500 for the output of the pixel data is started. The printer controller 45 is operated in parallel to the operation of the address generator, the printer controller 45 applying a shift clock signal SCL to the shift register in order to serially output the pixel data from the shift register. In step 431 of the sub-routine 400, the value of the counter of the address group is incremented by the value one independently thereof. An ninth interrogation step 432 has then been reached wherein a determination is made as to whether the numerical value A of the counter of the address group has already reached the limit value 23. If this is not the case, then a branch is made back to the first query step 403. If the limit value 23 has already been reached, then the sub-routine 400 is stopped. So that the sub-routines 300, 400, 500 can overlap in some time segments, i.e. can simultaneously sequence in terms of time, the corresponding controllers in separate circuit parts that exchange signals with one another during the executive sequence 100 of the printer controller are hard-programmed. This exchange is synchronized by means of clock pulses in a way that is known and not shown herein. It is advantageous for the address controller 44 when an AG-busy signal having the value "zero" is synchronously output with clock pulses in the step 433 and the sub-routine 400 is then stopped in step 434.

FIG. 14 shows a table for the address generation by means of the aforementioned routine 400. In practice, the address generator 44 preferably generates the address values as a binary number and this is applied to the pixel data-editing units 41, 42. As is known, a binary number can be represented, for example, as a hexadecimal number or as a decimal number, as a result whereof the representation requires less space. Decimal numbers are entered in the table only for this reason and for ease of comprehension. The routine 400 first generates a primitive address P:=1 and a binary number zero as address read signal AR for a first address group A:=1. A corresponding binary number as address read signal AR for the first address group A:=1 is then successively generated up to a primitive address P:=14. The address read signal AR (address read) is thus generated for 14 binary numbers per address group. Corresponding binary numbers as address read signal AR thus are generated successively for 22 address groups. A binary pixel datum in the buffer memory is accessed by each and every address read signal AR.

The driver units 11 and 12 ignore the binary pixel data that are read given address values A=1 with P=2, A=7 with P=13, A=8 with P=1 and with P=14, A=15 with P=1 and with P=14, A=16 with P=2 as well as A=22 with P=14. The address values higher than 500 therefore need not be capable of being completely generated as binary number. For offering binary pixel data, all address values higher than 299 are in fact generated but are likewise not required when printing.

The routine 400 is implemented until all print image columns have been printed. It has already been explained in conjunction with FIGS. 9a, 9b and 10b that the nozzle rows of a printhead become active in alternation for printing print image columns within a time range for printing with high resolution. When printing with low resolution, however, only one nozzle row need be active.

Alternatively, it is fundamentally possible when printing with low resolution for both nozzle rows to be activated in alternation, with the change being made by data strings. To that end, such a change must be taken into consideration in the print data. Before every start of the address generator the printer controller 45 (in step 109 of FIG. 11) can additionally change the value Q under the condition $F_A \neq 1$, for example from Q=1 to Q=0 and vice versa. As an alternative to changing by data strings, of course, the selected nozzle row of the printhead can be changed by print images. In such an instance, the non-selected nozzle row of the printhead pauses until the print image that comes next. This prevents one of the two nozzle rows from being disproportionately used and a premature failure of the printhead is prevented.

While one of the buffer memories is being loaded with binary pixel data by direct memory access, the other buffer memory is read out in order to transmit edited groups of binary pixel data to the driver units. The repetition of the routine 400 and further subsequent steps are implemented by the printer controller 45 that, controlled by a signal e of an encoder 3, also generates the print signals Print1 or, respectively, Print2.

Figure 15:
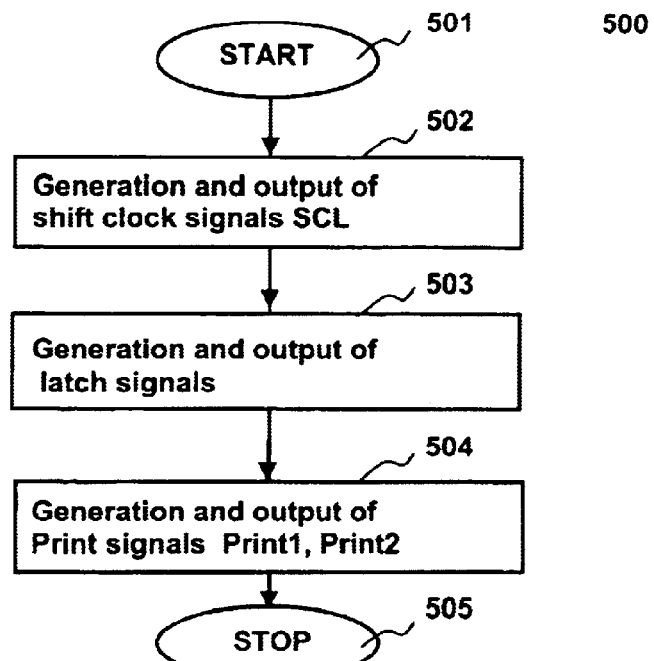
FIG. 15 is a flowchart of the output routine in accordance with the invention.

FIG. 15 shows a flowchart of the print routine 500. The print routine 500 is called as a sub-routine during the course of the sub-routine 400 in order to drive the shift registers in the print data control 41, 42 and in order to drive the driver units (pen driver boards) 11, 12. After the start in step 501, a step 502 is reached and a shift clock SCL is generated in order to move the pixel data stored in the shift register from the shift register to the respective driver unit 11 or 12 via the serial data output. Subsequently, a latch signal is generated in step 503 and output to the driver units (pen driver boards) 11, 12. The print signals Print1, Print2 are then generated in step 504 and supplied to the driver units (pen driver boards) 11, 12, and the sub-routine 500 is stopped in step 505.

A first or second number of data words that contain binary pixel data for a first or second ink jet printhead 1, 2 exists in each data string. One half of each print image column is printed out with each ink jet printhead 1, 2. The first and second nozzle rows of each ink jet printhead 1, 2 simultaneously print the pixels with odd numbers on at least the one half of a first print image column and the pixels with even numbers on at least the one half of a second print image column. The first or second number of data words in the data string respectively contains the binary pixel data for both nozzle rows of the first or second ink jet printhead. Each data word of each data string contains only the first or further pixel data for printing a first or further print image column, so that one of the print image columns is present completely printed only after the printout of the pixel data of, for example, three data strings or at least one further data string. From each data string, thus, that nozzle row disposed at first position in the transport direction is supplied time-offset with the binary pixel data for the pixels with odd numbers of the first print image column, while the nozzle row disposed at second position in the transport direction is already supplied with the binary pixel data for the pixels with even numbers of the following further print image column. Each print image column half is printed out by a first and second nozzle row of each and every ink jet printhead so that chronologically after the printing with the respectively second nozzle row—each print image column half is completed by a printing with the first nozzle row.

The first print image column thus is printed out spaced from the second print image column in the transport direction. The two print image columns lie farther from one another for some printhead types and very close to one another for other types. For enhancing the print image resolution, particularly to 600 dpi, further print image columns lie within the spacing or interval in the transport direction. The number U of data strings that are stored in the pixel memory for a print image is correspondingly increased.

Figure 16A:
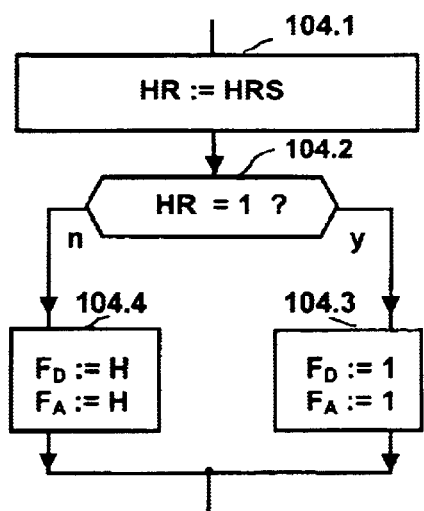
FIGS. 16a and 16b, respectively show detail of the executive sequence control according to FIG. 11.

FIG. 16a shows a detail of the flowchart according to FIG. 11 with the executive sequencer of the printer controller. Within the step 104, the HR register in the printer controller is loaded with a start value HRS in the sub-step 104.1. A check is made in a interrogation step 104.2 to determine whether the start value HR=1 is present, and thus high resolution is to be printed from the very start. If this is the case, then the registers for the compression factor $F_D$ and for the decompression factor $F_A$ are set to the value "one" in the sub-step 104.3. If this is not the case, the registers of the compression or decompression factors $F_D$ or $F_A$ are set to the value "zero" in the sub-step 104.4, which corresponds to the example with HR:=0 and a compression factor of $F_D$=2 discussed on the basis of FIG. 1d.

Figure 16B:
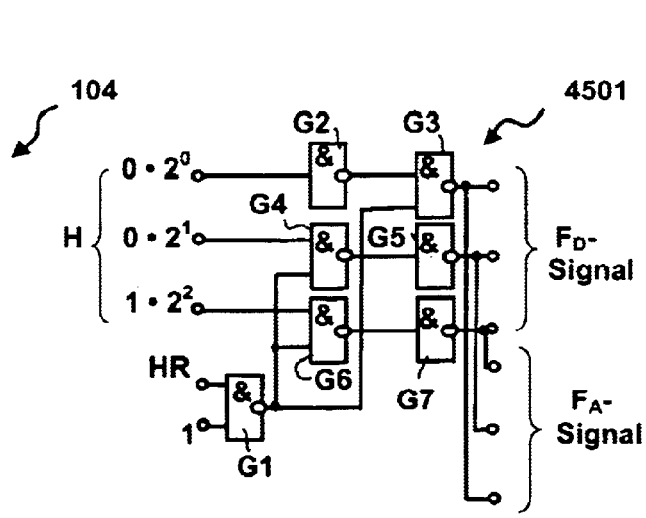

FIG. 16b shows a logic circuit 4501 in an embodiment with NAND gates that executes the sub-steps 104.2, 104.3 and 104.4. These sub-steps are components of the step 104 shown in FIG. 16a. NAND gates and further registers that are not shown are required for the realization of the flowchart. A value, for example H=4, prescribed by the aforementioned circuit means is presented as a binary number $1*2^2$; $0*2^1$; $0*2^0$ and is applied to the gates G2, G4, G6 at the input side of the logic 4501, which emits the 3-bit $F_D$ signal or $F_A$ signal at its output side via gates G3, G5, G7 dependent on the HR signal, which is likewise present at the input side of the logic 4501 at gate G1. A minimal version with a 1-bit $F_D$ signal or $F_A$ signal is not separately shown but can be easily derived therefrom for the switching from the maximum resolution to half resolution or vice versa. The more significant places of the binary number, and thus four of the seven gates, are thereby eliminated, i.e. all except G1, G2 and G3. An alternative embodiment based on NOR gates likewise can be utilized. The embodiment and the specific circuitry are based on the nature of the hardware that is utilize—ASIC or FPGA—and can be produced by means of a development tool that runs on a computer as an application program to generate circuitry of the ASIC or FPGA. If an FPGA is used, up to one hundred thousand gate equivalents (for example NAND) are available in order to also realize circuit versions having an extremely great number of gates essentially with a commercially available module.

Figure 13B:
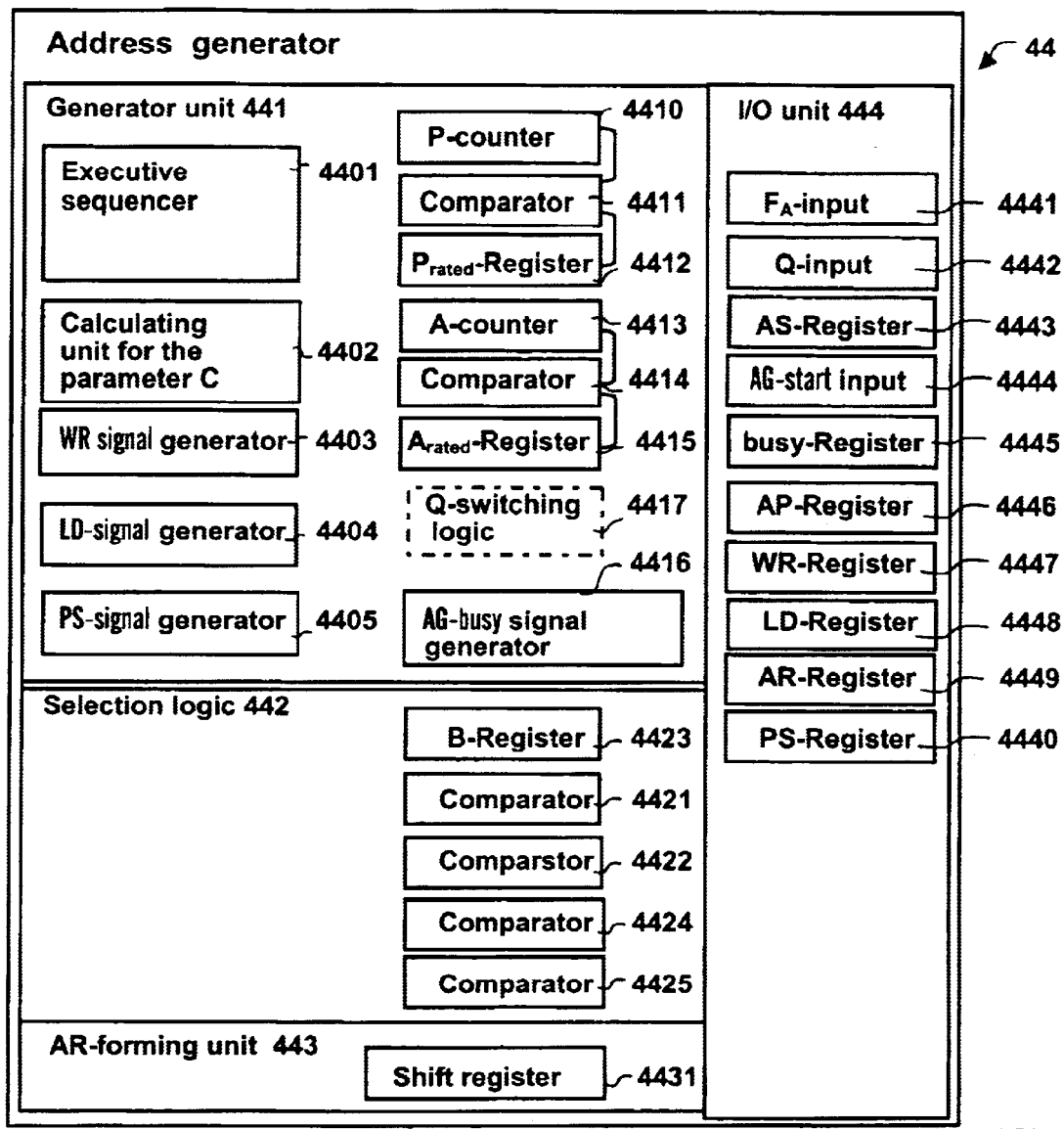

FIG. 13b shows a block circuit diagram of an embodiment of the address generator. The address generator 44 has input/output logic 444 and selection logic 442 connected between the unit 441 for generating read addresses and the address read signal generator 443 for forming the address read signal AR, so that the selection logic 442 is operated for selecting read addresses dependent on the decompression factor $F_A$. The selection logic 442 generates the additional address signal AS that is applied to the selector 413, 423. A voltage potential with the value "zero" for supplementing the pixel data that are missing because of the compression is applied to another input of the fourth multiplexer 4236. A switch to the voltage potential having the value "zero" is undertaken when the additional address signal AS has the value "zero" (FIG. 4). Arranged in the unit 441 for generating read addresses are a first counter 4410 for the primitive address and an allocated, first comparator 4411 for the comparison of a count value P of the primitive address to a first reference value that is supplied from a first reference value register 4412, and a second counter 4413 for an address group and an allocated, second comparator 4414 for the comparison of a count value A of the address group to a second reference value that is supplied by a second reference value generator, as well as an executive sequencer 4401. The executive sequencer 4402 collaborates with a calculating unit 4402 for the parameter C, a WR signal generator 4403, an LD signal generator 4404, a PS signal generator 4405, with the counters 4410 and 4413, with the comparators 4411 and 4414, with the registers 4412 and 4415 as well as with an AG-busy signal generator and, as needed, with a further switchover logic 4417 (shown with broken lines). The comparison in the first comparator 4441 is undertaken after a formation of the address read signal AR and after an incrementation of a count value P for the primitive address by the value "one." The counter for an address group is incremented by the value "one" after a number of read addresses are successively generated, until an upward transgression of a reference value (overflow) of the counter for the primitive address is triggered. This causes a load signal LD to be output and a sub-routine for the output is started. A downward transgression of the second reference value in the comparison in the second comparator 4414 triggers a resetting of the count value P of the primitive address to the value "one" and generation of a following read address that belongs to a further address group.

The input/output logic 444 of the address generator 44 has an input 4441 for the communicated decompression factor $F_A$, an input 4442 for receiving a start value Q for a variable B, a register 4443 for the additional address signal AS, an input 4444 for the reception of the address generator start signal and a register 4445 for the address generator busy signal to be sent. The selection logic 442 has a register 4423 for the variable B and first comparison logic 4421 for generating the additional address signal AS with the value "zero." This signal is generated when both the variable B and the decompression factor $F_A$ communicated from the printer controller 45 in the $F_A$ -signal are set to a value unequal to "one" or when the decompression factor $F_A$ is set to a value unequal to "one" and the variable B is equal to the value "one" and the decompression factor $F_A$ is set to a value unequal to the value "two" and the count value A of the address group is an even number.

The selection logic 442 also has a second comparison logic 4422 for generating the additional address signal AS with the value "one" that is generated when the decompression factor $F_A$ communicated from the printer controller (45) in the $F_A$ -signal is set to the value "one."

The second comparison logic 4422 has a comparator 4424 for generating the additional address signal AS with a value "one" when the decompression factor $F_A$ is set to a value unequal to the value "one" and the variable B is equal to "one" and the decompression factor $F_A$ is set to a value equal to "two" or the decompression factor $F_A$ is set to a value not equal to "two" and the count value A of the address group is not an even number.

The value is set to "one" in the register for the variable B when the selection logic generates the additional address signal AS with the value "zero." With every generation of the additional address signal AS with the value "one", the selection logic resets the value in the register for the variable B to the value "zero."

A further comparator 4425 is provided in the selection logic 442 so that the address read signal AR is generated only of read addresses with a positive value. This corresponds to the query step 418.7 according to FIG. 13a.

For forming the address read signal AR, the means of the AR-forming unit 443 include a shift register 4431 wherein a binary number stored corresponding to the generated read address is shifted by at least one place when a decompression factor $F_A$ that deviates from the value "one" is present at the input 4441 of the address generator 44.

The unit 441 for generating a read address has a number of counters that are connected in order to couple the formation of the address read signal AR to a primitive address signal AP, so that each count value P for the primitive address can repeat and a number of read addresses can be allocated to each count value P. The selection logic 442 selects at least one group of read addresses dependent on the variable B and on the decompression factor $F_A$.

The executive sequencer 4401 is connected to a calculating unit 4402 for the parameter C, to a signal generator 4403 for generating a write signal WR, and to a signal generator 4404 for generating a load signal LD, and to a further signal generator 4405 for generating a print start signal PS for initiating the printout of the pixel data from a data string, and to a busy signal generator 4416. The input/output logic 444 of the address generator 44 has a register 4446 for the output of the primitive address AP, a register 4447 for the write signal WR, a register 4448 for the load signal LD, a register 4449 for the output of the address read signal AR and a register 4440 for the output of the print start signal PS.

In an alternative embodiment, the fourth multiplexer 4136 or 4236, which (according to FIG. 4) has an output connected to the data input of a following demultiplexer 4134 or 4234, can be omitted when its function is taken over by the first and second multiplexers 4131 and 4132, or 4231 and 4232. The separate control line (shown in FIG. 3) to the pixel data editing unit can be omitted when a further data input—at which an additional voltage potential having the value "zero" is present by means of the additional address signal AS that is generated as a component part of the address read signal AR—is through-connected onto the output of the first and second multiplexers 4131 and 4132, or 4231 and 4232.

Figure 17:
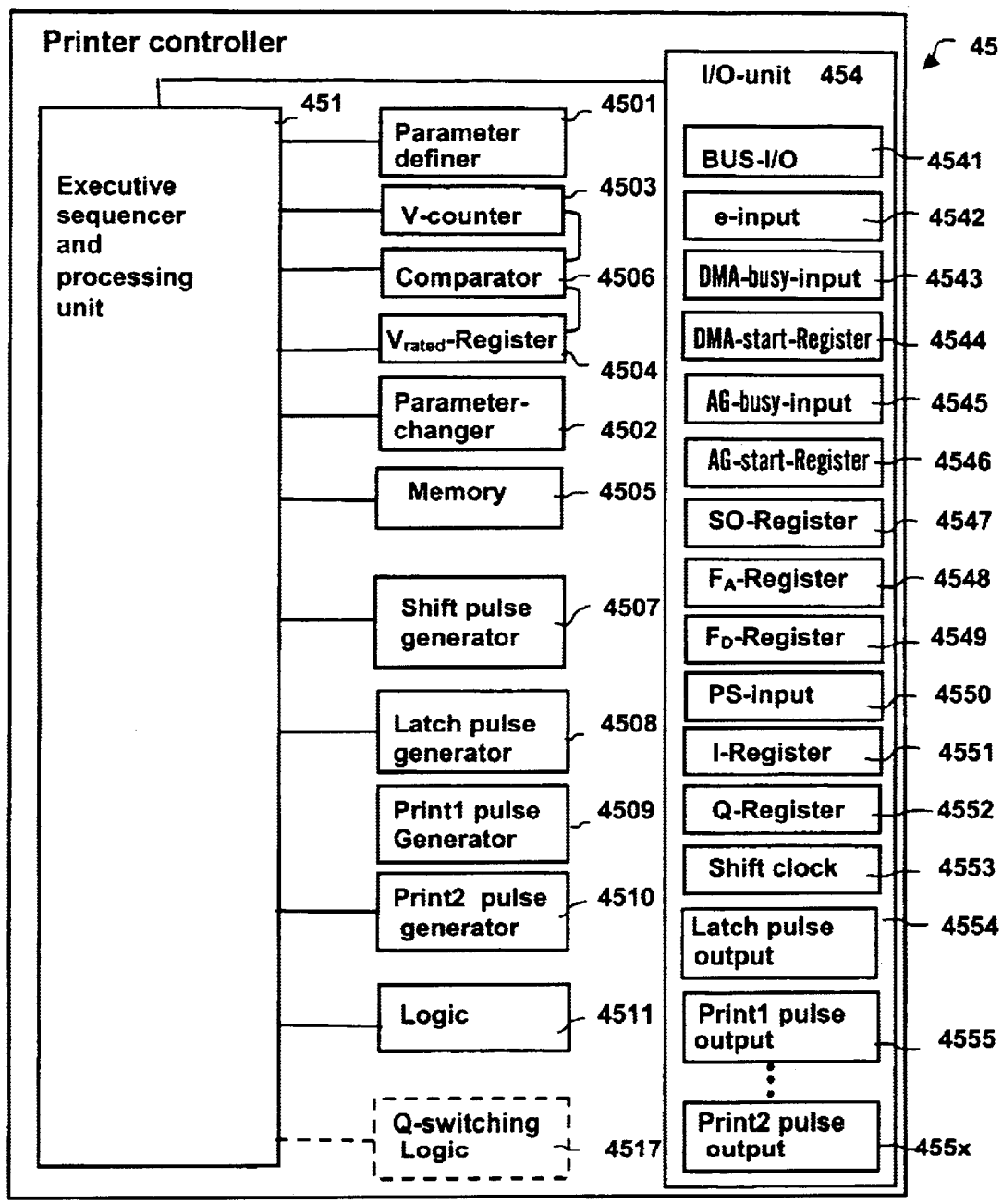
FIG. 17 is a block circuit diagram of the printer controller in accordance with the invention.

FIG. 17 shows a block circuit diagram for a printer controller 45. Connected to an executive sequencer and processing unit 451 are an input/output 454 and at least the following blocks: a parameter definer 4501, a parameter changer 4502, a V-counter 4503, a comparator 4506, a $V_{rated}$ register 4504, a memory 4505, a shift pulse generator 4507, a latch pulse generator 4508, a first print pulse generator 4509, a second print pulse generator 4510, a logic 4511 as well as, possibly, a switchover logic 4517.

The input/output unit 454 has at least the following blocks: a bus input/output unit 4541, an input 4542 for the encoder signal e, an input 4543 for the DMA-busy signal, a register 4544 for the DMA-start signal, an input 4545 for the AG-busy signal, a register 4546 for AG-start signal, a register 4547 for the switchover signal SO, an $F_A$ register 4548, an $F_D$ register 4549, an input 4550 for the PS signal, an output 4551 for the I signal, an output 4553 for the shift clock signal, an output 4554 for the latch pulse signal, a print1 pulse output 4555 and a print2 pulse output 455x. A Q register 4552 in the I/O unit 454 communicates a start value Q to the address generator 44.

The printer controller 45 likewise can be realized in the embodiment that has already been explained or in an alternative embodiment, whereby each printer controller 45—dependent on the embodiment—has a data string counter 45 and is connected to the encoder 3. After every printed data string, the value V of the data string counter is incremented at the appearance of the encoder clock, whereby the value of the high resolution register is changed when a prescribed, first reference value of the data string counter is reached, and the printing of the print image is ended when a prescribed, second rated value U of the data string counter is reached.

As a parameter changer 4502, the printer controller 45 can have a first switchover 45021 in order to change the compression factor to the value equal to "one" ($F_D:=1$) when the high resolution signal has the value equal to "zero" (HR:=0) and is switched to the value equal to "one" (HR:=1). The printer controller 45 has a second switchover 45022 in order to change the compression factor to a predetermined, even-numbered value ($F_D:=H$) when the high resolution signal has the value equal to "one" (HR:=1) and is switched to the value equal to "zero" (HR:=0).

The parameter changer 4502 can have NAND gates interconnected to one another for fulfilling this function.

The corresponding parameters for at least one further reference value $V_{rated2}$ of the data string counter and an appertaining value for the resolution H can be loaded into the memory 4505 of the printer controller 45 via the bus 5 and the bus input/output unit 4541. The next reference value $V_{rated2}$ is transferred into the register 4504 after the interrogation step 111 of the routine 100 was executed (FIG. 11).

Alternatively, further reference value registers and comparators can be present in the printer controller 45 in order to modify the current print resolution with every further equality of the reference value of one of the reference value registers with the current count value of the data string counter. In one case, the corresponding parameters from which data string count what resolution is used for printing are programmed-in between the printings or during printing. In another case, the corresponding parameters from which data string count what resolution is used for printing are preset or permanently programmed.

Alternatively, further switchover logic 4517 (shown with broken lines) can be arranged in the printer controller 45 in order to change the start value Q for the address generator 44 synchronously with the switchover signal SO, so that the nozzles rows of a printhead are operated in alternation. The start value is communicated to the Q input of the address generator 44 via a separate control line.

In another version, the control line for the switchover signal SO is forwarded to the address generator 44, which itself then generates a start value Q synchronously with the switchover signal SO by means of further switchover logic 4417 (shown with broken lines). An SO input is then realized instead of the Q input. Given a start value Q with the value "one", the first generated read address is selected and the following and every other read address that can be allocated to an even-numbered primitive address is ignored. Given a start value Q with the value "zero", the first generated read address is ignored and the following and every other read address that can be allocated to an even-numbered primitive address is selected. The alternating pausing of the nozzle rows, of course, must likewise be taken into consideration in the generation of the pixel data and storing in the pixel memory.

In a modified embodiment having only a single printhead, only a single pixel data editing unit 42 and the specific controller 43, 44 and 45 are advantageously required. The printer controller 45 and the address generator 44 can likewise be more simply constructed in a corresponding fashion. When the printhead is equipped with only a single nozzle row for printing a print image column, then the sequence of the binary pixel data in the data string coincides with the sequence of the pixels in the print image column. Consequently, the sequence of the binary pixel data is then modified by print image columns during printing in conformity with the type of printhead.

Figure 18:
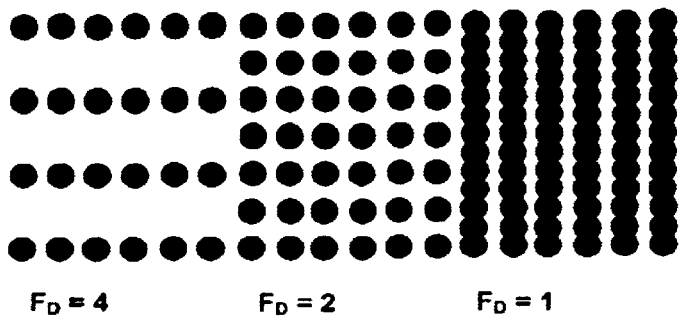
FIG. 18 is an illustration of various print resolutions in accordance with the invention.

Independently of all embodiments, the arrangement of binary pixel data in the pixel memory RAM 7 can be advantageously organized such that a modification of picture elements is possible in an easy and uncomplicated way. Advantageously, the sequence of the binary pixel data within a data string can be modified in conformity with the type of printhead during printing. Within a print section, the number of binary pixel data within each and every data string can be reduced, with the data being generated in compressed form present stored in the pixel memory in the form of 16-bit data words. The number of 16-bit data words is determined by the compression factor, and the DMA controller 43 or the address generator is switchable for different compression factors $F_D$=1, 2 or 4, or decompression factors $F_A$=1, 2 or 4. FIG. 18 shows various vertical print resolutions (orthogonal to the transport direction) that occur given a switching of the compression factors $F_D$=1, 2 or 4, with the horizontal print resolutions remaining the same (300 dpi in the transport direction). Given a required high resolution, operation is carried out with 600 dpi orthogonally to the transport direction, i.e. a compression factor $F_D$=1 and decompression factor $F_A$=1. Given the compression factor $F_D$=2 or $F_D$=4, vertical print resolutions of 300 dpi or 150 dpi arise. In that print section wherein high resolution is not required, memory space in the pixel memory can be saved by data compression. The data compression has no negative effects on the easily implemented modification of variable picture elements and can be implemented for the following data string in the pixel memory in an uncomplicated way by the microprocessor during the printing of the one data string.

Although modifications and changes may be suggested by those skilled in the art, it is the inventor to embody within the patent warranted hereon all changes and modifications as reasonably and property come within the scope of his contribution to the art.

I claim as my invention:

1. An arrangement for printing a print image with regions of said print image having respectively different print image resolutions comprising:

a printhead adapted to print a print image on an item moving past said printhead;

an encoder that generates signals indicative of movement of said item relative to said printhead;

a pixel memory;

a print data controller;

a microprocessor connected to said pixel memory, said microprocessor causing pixel data to be stored in said pixel memory in compressed form in a plurality of data strings each containing a plurality of data words;

said microprocessor being programmed to communicate a start value for high resolution to the printer controller via a bus;

said print data controller being composed of a pixel data editing unit, a Direct Memory Access (DMA) controller, an address generator and a printer controller, whereby the printer controller is connected in terms of control to the DMA controller, to the address generator and to the pixel data editing unit, said printer controller being connected to said encoder, said microprocessor, said pixel memory, and said printhead for controlling transfer of said pixel data word-by-word from said pixel memory to one of two buffer memories of said print data controller for intermediate storage therein in the form of a data string having a switchable number of data words with pixel data in compressed form and dependent on the required resolution for a region of said print image, for editing the data words stored in the other of the buffer memories and supplying the pixel data to said printhead, wherein said print data controller is equipped to supplement pixel data missing because of the comparison dependent on the required resolution for a region of said print image and for printing said image column-by-column with said printhead said print data controller having two buffer memories; and said microprocessor, for a selected region of said image, setting a print image resolution for said region and is programmed to supply at least one parameter for the control of the resolution to the print data controller and the print data controller correspondingly switches the resolution that will be achieved in printing.

2. An arrangement as claimed in claim 1 wherein the DMA controller comprises at least an executive sequencer, a word counter, a rated value register, an input/output logic, a memory, a comparator and a shift register that are interconnected to one another in order to implement DMA cycles.

3. An arrangement as claimed in claim 2 wherein the input/output logic comprises at least an input for the communicated compression factor, an input for the received DMA start signal and registers for the select signals to be sent, a register for the DMA-busy signal to be sent, a register for the request signal to be sent, an input for the received acknowledge signal, and input for the switchover signal and registers for the address write signal.

4. An arrangement as claimed in claim 1 wherein the printer controller comprises a parameter changer with NAND gates that are interconnected to one another in order to change the compression factor to the value equal to "one" when the high resolution signal has the value equal to "zero" and is switched to the value equal to "one" and in order to change the compression factor to s predetermined, even-numbered value when the high resolution signal has the value equal to "one" and is switched to the value equal to "zero".

5. An arrangement as claimed in claim 1 wherein the printer controller is equipped with means for generating an $F_A$-signal and an $F_D$-signal corresponding to the factors, for controlling the printing with different resolution whereby the factors are equal to the value "one" of the start value (HRS) or different from the value "zero" of the start value, whereby the factors are set at least equal to the value "two", whereby the DMA controller can be switched by an FD signal communicated via a control line, such that the plurality of DMA cycles is at least halved when loading binary pixel data into a buffer memory of the pixel data editing unit, and whereby the address generator is switchable by an FA signal communicated via a control line such that at least halved read addresses for a read access onto the buffer memories of the pixel data editing unit are then generated.

6. An arrangement as claimed in claim 5 wherein the ratio of the maximum plurality of DMA cycles to the reduced plurality of DMA cycles corresponds to the compression factor communicated via FD signal, and that the compression factor applied to one and the same data string is equal to the decompression factor communicated via FA signal.

7. An arrangement as claimed in claim 1 wherein the pixel data editing unit contains a selector and a shift register, whereby the selector is connected to the buffer memories for the selection of the binary pixel data and is equipped with the means for supplementing the pixel data missing due to the compression, and whereby the shift register is connected to the output of the selector for parallel/serial conversion and offers the binary pixel data in a sequence required for the type of printhead.

8. An arrangement as claimed in claim 1 wherein the printer controller is connected in terms of control to the DMA controller, the address generator and the pixel data editing unit: wherein a DMA start signal is communicated to the DMA controller that, as a result of a plurality of implemented DMA cycles, makes the pixel data of a data string available by data strings to the pixel data editing unit; wherein an AG start signal is communicated from the printer controller to the address generator, whereby the address generator comprises a unit for generating read addresses and an address read signal former dependent on the decompression factor, whereby the address read signal corresponds to the quotient of the read addresses generated for a read access onto the buffer memories and the decompression factor; and wherein the pixel data editing unit comprises a first buffer memory and a second buffer memory for each printhead, whereby the buffer memories store a data string in alternation and comprise an address input for applying the address read signal.

9. An arrangement as claimed in claim 8 wherein the printer controller is fashioned with means for generating a switchover signal and is connected to the DMA controller as well as to the pixel data editing unit, whereby the switchover signal comprises a first value "one" for preventing the readout from the respectively first buffer memory and for allowing the readout from the respectively second buffer memory or, respectively, whereby the switchover signal comprises a second value "zero" for allowing the readout from the respectively first buffer memory and for preventing the readout from the respectively second buffer memory.

10. An arrangement as claimed in claim 8 wherein at least the less-significant addresses of the address read signal also is present at the selector of the pixel data editing unit, and that the address generator comprises a primitive address signal generator and a write signal generator connected to said selector.

11. An arrangement as claimed in claim 8 wherein the first and second buffer memories are each a dual-port RAM; and wherein the selector comprises a first multiplexer that selects a single bit of the binary pixel data when the less significant part of the address read signal is present at its address input, whereby the first multiplexer following the first dual-port RAM has an output side connected to a first data input of a third multiplexer, and whereby a second multiplexer following the second dual-port RAM has an output side connected to a second data input of the third multiplexer; wherein a switchover signal is present at the control input of the third multiplexer, so that said single bit of the binary pixel data is output and is present at the data input of a following, fourth multiplexer and is through-connected to the data input of a following demultiplexer when an additional address signal having a first value "one" is present at the control input; wherein the demultiplexer is followed by a resettable collecting register for binary pixel data that comprises a 14-bit parallel data output, whereby said single bit of the binary pixel data is transferred into the collecting register when a write signal is applied to a control input of the collecting register; in that the primitive address signal that sets the memory location of the bit in the collecting register is supplied to the demultiplexer.

12. An arrangement as claimed in claim 11 wherein the address generator comprises an input/output logic and a selection logic that is circuited between the unit for generating read addresses and the address read signal former; in that the selection logic is operated for the selection of read addresses dependent on the decompression factor.

13. An arrangement as claimed in claim 12 wherein the output of the third multiplexer is directly connected to the data input of the following demultiplexer; and wherein an additional voltage potential having the value "zero" is present at respective further data inputs of said first and second multiplexers, said additional voltage potential having the value "zero" being through-connected onto the output of the first and second multiplexers, whereby the additional address signal is generated by the selection logic as a component of the address read signal.

14. An arrangement as claimed in claim 13 wherein the selection logic generates the additional address signal that is applied to the selector; in that a voltage potential having the value "zero" is present at the other input of the fourth multiplexer for supplementing the value of the pixel data missing due to the compression, whereby a switch is made onto the voltage potential having the value "zero" when the additional address signal comprises the value "zero".

15. An arrangement as claimed in claim 13 wherein the unit for generating read addresses comprises a first counter for the primitive address and an allocated, first comparator for the comparison of a count value of the primitive address to a first rated value that is supplied from a register, and comprises a second counter for an address group and an allocated, second comparator for the comparison of a count value of the address group to a second rated value that is supplied from a register, and also comprises an executive sequencer, whereby the comparison in the first comparator is undertaken after a formation of the address read signal and after an incrementation of a count value for the primitive address by the value "one", whereby the counter for an address group is incremented by the value "one" after a plurality of read addresses are successively generated, an upward transgression of a rated value or, respectively, an overflow of the counter for the primitive address is triggered, a load signal is output and a sub-routine for the output is started, whereby a downward transgression of the second rated value in the comparison in the second comparator triggers a resetting of the count value of the primitive address to the value "one" and a generation of a following read address that belongs to a further address group.

16. An arrangement as claimed in claim 12 wherein the input/output logic of the address generator comprises an input for the communicated decompression factor, an input for receiving a start value for a variable, a register for the additional address signal, an input for the reception of the address generator start signal and a register for the address generator busy signal to be sent; in that the selection logic comprises a register for the variable and a first comparison logic for generating the additional address signal with the value "zero" that is generated when both the variable and the decompression factor communicated from the printer controller in the FA-signal are set to a value unequal to "one" or when the decompression factor is set to a value unequal to the value "one" and the variable is equal to the value "one" and the decompression factor is set to a value unequal to the value "two" and the count value of the address group is an even number.

17. An arrangement as claimed in claim 16 wherein the selection logic comprises a second comparison logic for generating the additional address signal with the value "one" that is generated when the decompression factor communicated from the printer controller in the FA-signal is set to the value "one".

18. An arrangement as claimed in claim 17 wherein a further comparator in addition to the second comparison logic are arranged for generating the additional address signal with the value "one" that is generated when the decompression factor is set to a value unequal to the value "one" and the variable is equal to the value "one" and the decompression factor is set to a value equal to the value "two" or the decompression factor is set to a value unequal to the value "two" and the count value of the address group is not an even number.

19. An arrangement as claimed in claim 16 wherein the value of the register for the variable is set to the value "one" when the selection logic generates the additional address signal with the value "zero"; and in that the selection logic resets the value in the register for the variable to the value "zero" with every generation of the additional address signal with the value "one".

20. An arrangement as claimed in claim 16 wherein a comparator is provided in the selection logic so that the address read signal is generated only from read addresses having a positive value.

21. An arrangement as claimed in claim 12 wherein the address read signal former includes a shift register in which a binary number stored corresponding to the generated read address is shifted by at least one place when a decompression factor that deviates from the value "one" is present in an input of the address generator.

22. An arrangement as claimed in claim 12 wherein the die unit for generating a read address comprises a plurality of counters that are connected in terms of circuitry in order to couple the formation of the address read signal to a primitive address signal such that every count value for the primitive address repeats and a plurality of read addresses can be allocated to each count value, whereby at least one group of read addresses is selected by the selection logic dependent on the variable and on the decompression factor.

23. An arrangement as claimed in claim 22 wherein the executive sequencer is connected to a signal generator for generating a write signal, to a signal generator for generating a load signal, to a signal generator for generating a print start signal and to an AG-busy signal generator; as well as in that the input/output logic of the address generator comprises a register for the output of the primitive address, a register for the write signal, a register for the load signal, a register for the output of the address read signal and a register for the output of the print start signal.

24. An arrangement as claimed in claim 8 wherein the printer controller comprises a data string counter and is connected to the encoder, whereby the value of the data string counter is incremented after every printed data string given the appearance of the encoder clock, whereby the value of the high resolution signal is changed when a prescribed, first rated value of the data string counter is reached, and whereby the printing of the print image is ended when a prescribed, second rated value of the data string counter is reached.

25. An arrangement as claimed in claim 1 wherein the further rated value registers and comparators are present in order to modify the current print resolution with every further equality of the rated value of one of the rated value registers with the current count value of the data string counter.

26. An arrangement as claimed in claim 1 wherein the printer controller comprises a first switchover in order to change the compression factor to the value equal to "one" when the high resolution signal has the value "zero" and is switched to the value equal to "one"; and in that the printer controller comprises a second switchover in order to change the compression factor to a predetermined, even-numbered value when the high resolution signal has the value equal to "one" and is switched to the value equal to "zero".

27. An arrangement as claimed in claim 26 wherein the printer controller comprises a logic to match the decompression factor to the current compression factor when the DMA controller and the address generator output a busy signal with the value "zero".

28. An arrangement as claimed in claim 26 comprising further reference value registers and comparators for modifying a current print resolution upon each equality of a value of "one" of the reference value registers with the current count value of the data string counter.

29. An arrangement as claimed in claim 1 wherein a further switchover logic or is arranged in the printer controller or in the address generator, said further switchover logic or changing a start value for the address generator synchronous to the switchover signal so that the nozzle rows of a printhead are operated in alternation.

* * * * *